(12) United States Patent
Sasaki et al.

(10) Patent No.: US 7,903,760 B2
(45) Date of Patent: Mar. 8, 2011

(54) DIGITAL MODULATION CIRCUIT AND METHOD AS WELL AS DIGITAL DEMODULATION CIRCUIT AND METHOD

(75) Inventors: Kazuji Sasaki, Kanagawa (JP); Masaya Takano, Tokyo (JP)

(73) Assignee: Sony Corporation, Tokyo (JP)

( * ) Notice: Subject to any disclaimer, the term of this patent is extended or adjusted under 35 U.S.C. 154(b) by 1075 days.

(21) Appl. No.: 10/960,120

(22) Filed: Oct. 8, 2004

(65) Prior Publication Data

US 2005/0111582 A1 May 26, 2005

(30) Foreign Application Priority Data

Oct. 17, 2003 (JP) ................................. P2003-358109

(51) Int. Cl.
*H04L 27/00* (2006.01)
(52) U.S. Cl. ......... 375/316; 375/324; 375/279; 375/282; 375/329; 375/330; 375/331; 375/332; 375/333
(58) Field of Classification Search .................. 375/324, 375/316, 279, 282, 283, 329, 330, 331, 332, 375/333
See application file for complete search history.

(56) References Cited

U.S. PATENT DOCUMENTS

| | | | | |
|---|---|---|---|---|
| 4,158,105 A | * | 6/1979 | Otani et al. | 375/354 |
| 4,472,817 A | * | 9/1984 | Poklemba et al. | 375/344 |
| 4,584,534 A | * | 4/1986 | Lijphart et al. | 329/308 |
| 4,592,075 A | * | 5/1986 | Tsukamoto | 375/327 |
| 4,606,048 A | * | 8/1986 | Sasaki et al. | 375/261 |
| 4,622,683 A | * | 11/1986 | Basham et al. | 375/336 |
| 4,795,986 A | * | 1/1989 | Ceroni et al. | 329/304 |
| 4,970,469 A | * | 11/1990 | Kasperkovitz | 329/325 |
| 5,347,228 A | * | 9/1994 | Iwasaki | 329/308 |
| 5,450,032 A | * | 9/1995 | Mimura et al. | 329/300 |
| 5,818,297 A | * | 10/1998 | Levionnais | 329/304 |
| 2002/0019983 A1 | * | 2/2002 | Emsley et al. | 725/107 |
| 2004/0057533 A1 | * | 3/2004 | Kermalli | 375/296 |

* cited by examiner

*Primary Examiner* — Chieh M Fan
*Assistant Examiner* — Siu M Lee
(74) *Attorney, Agent, or Firm* — Oblon, Spivak, McClelland, Maier & Neustadt, L.L.P.

(57) ABSTRACT

A mixer circuit accumulates I signal (digital signal of first channel) having its band limited by low-pass filter and first carrier signal to perform two-phase shift keying modulation thereon. An adder adds fundamental-wave component of bit clock signal BCK into Q signal (digital signal of second channel) having its band limited by the another low-pass filter to obtain a resultant added-up signal. Another mixer circuit accumulates the added-up signal and second carrier signal to perform two-phase shift keying modulation thereon. Output signals of the mixer circuits are input to another adder so that they may be added up to obtain a QPSK signal as a modulated quadrature signal. The QPSK signal contains frequency signals whose frequencies are a sum of bit clock frequency and carrier frequency and a difference between them. When demodulating, the carrier signal and the bit clock signal are reproduced using the frequency signals.

14 Claims, 9 Drawing Sheets

F I G. 5A
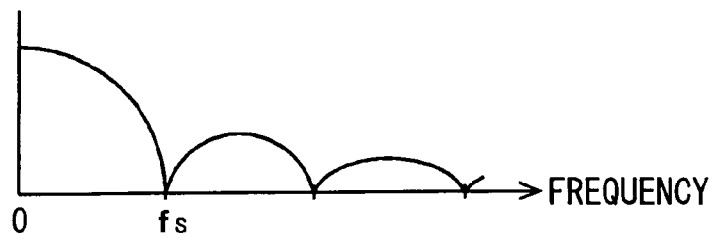
F I G. 5B
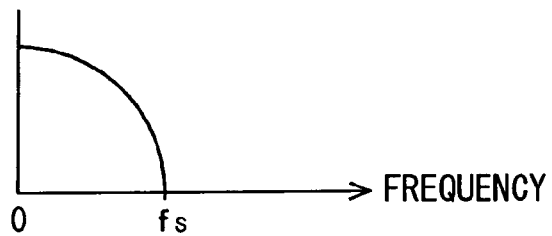
F I G. 5C
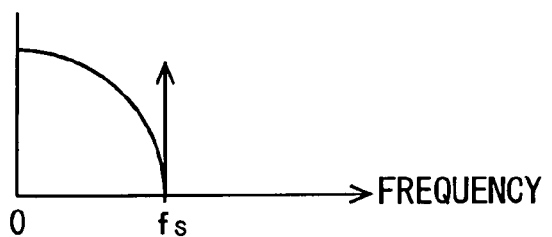
F I G. 5D
($S_{QM}$)
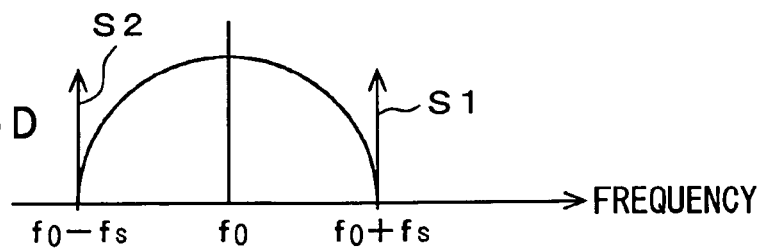

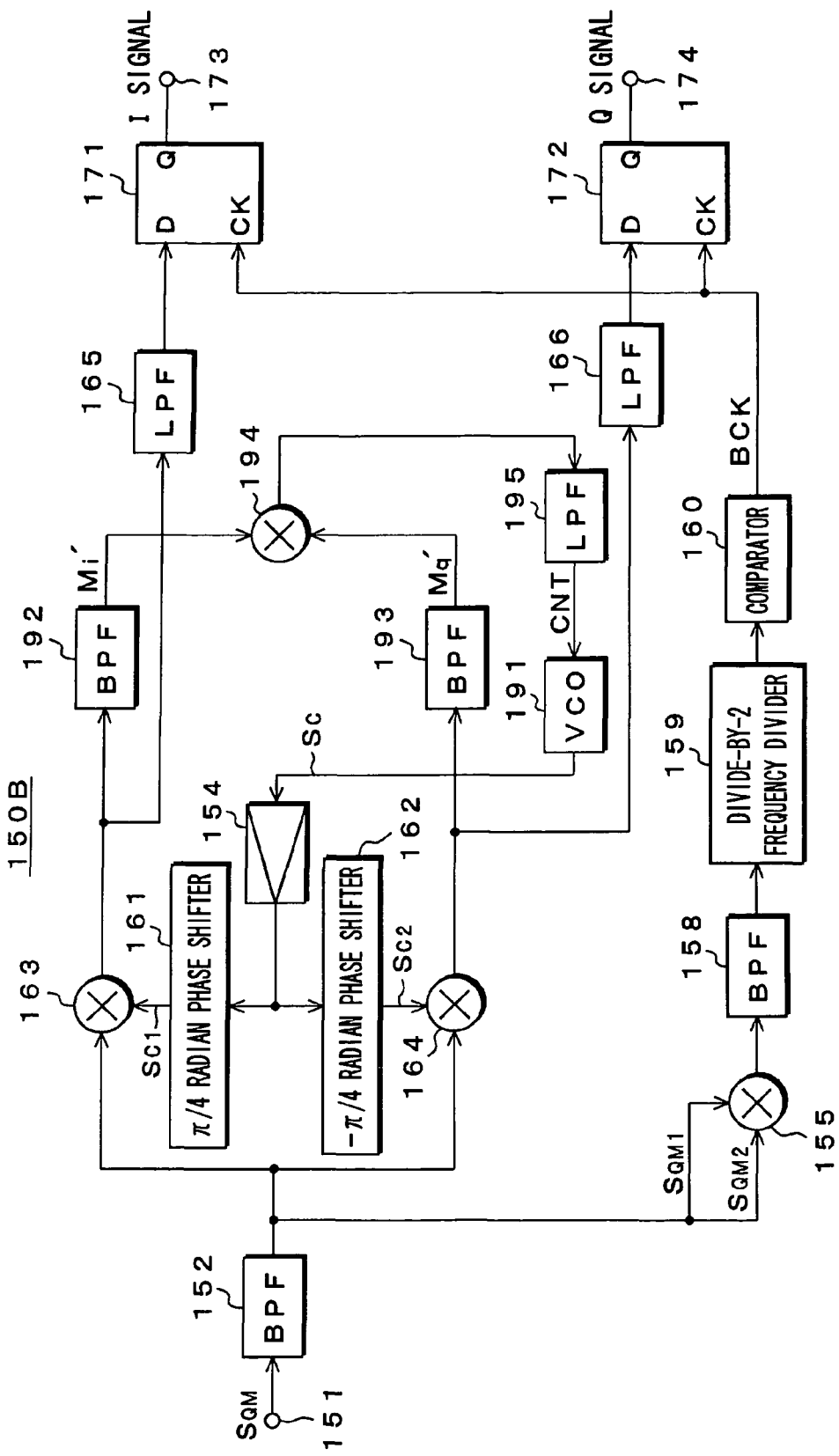

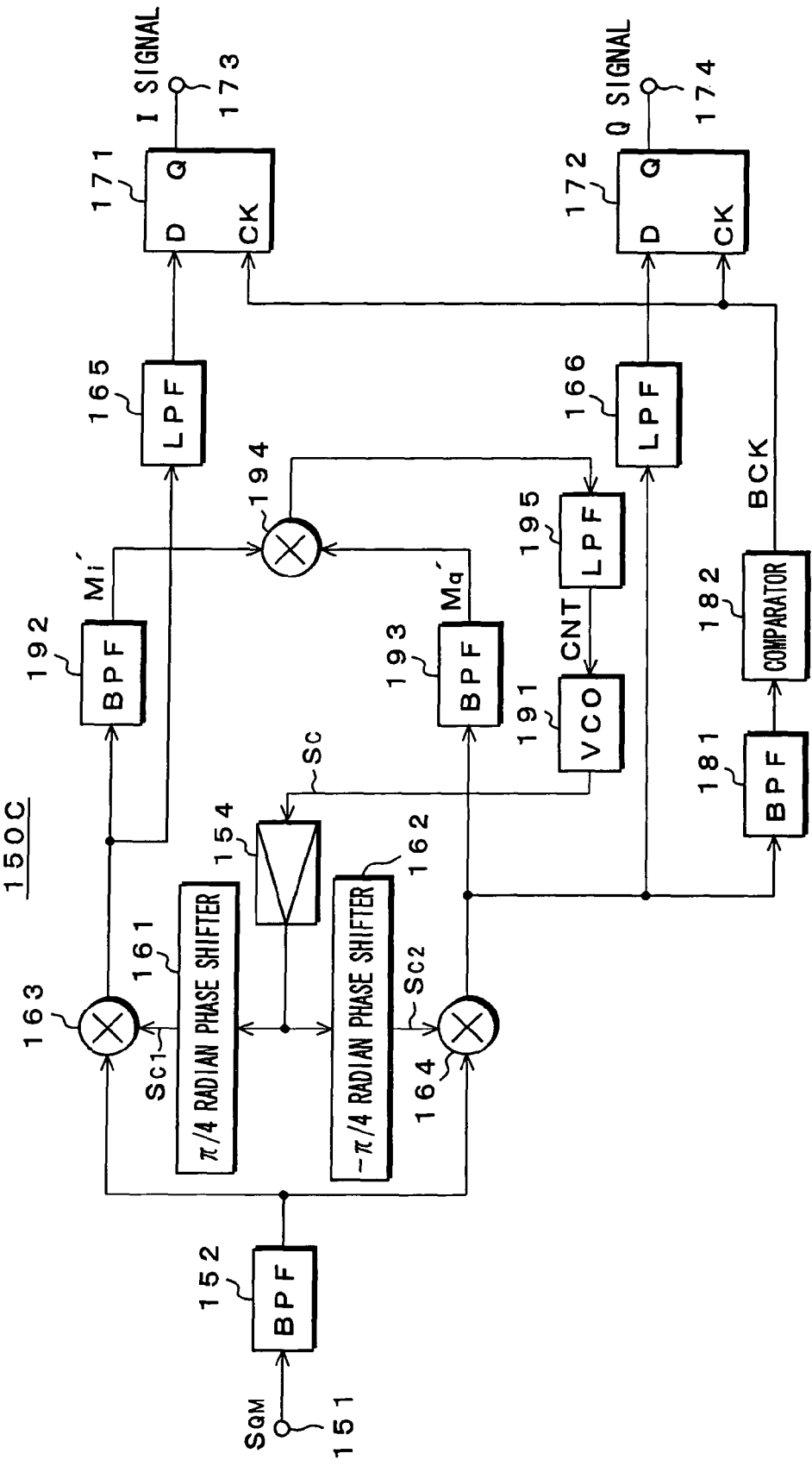

DIGITAL MODULATION CIRCUIT AND METHOD AS WELL AS DIGITAL DEMODULATION CIRCUIT AND METHOD

BACKGROUND OF THE INVENTION

1. Field of the Invention

The present invention relates to digital modulation circuit and method as well as digital demodulation circuit and method. More specifically, it relates to digital modulation circuit and method, digital demodulation circuit and method, circuit for and method of generating a demodulation carrier signal, and circuit for and method of generating a demodulation bit clock signal, which are well applicable to processing such as QPSK modulation/demodulation.

2. Description of Related Art

It is known that, for example, in a cable television (CATV) broadcast system or a satellite TV broadcast system, an image signal transmission method has been changed from an analog transmission to a digital transmission. In the digital transmission, a transmission side modulates an image signal into a digital signal and transmits it, and a reception side demodulates the received digital signal into the image signal.

As digital modulation, for example, quadrature phase shift keying (QPSK) modulation is known. FIG. 1 shows a configuration of one example of a conventional QPSK modulation circuit.

This QPSK modulation circuit 210 has an input terminal 211 for receiving an I signal as a first-channel digital signal, an input terminal 212 for receiving a Q signal as a second-channel digital signal, and an input terminal 213 for receiving a bit clock signal BCK having a frequency corresponding to a bit rate of the I signal or the Q signal.

Further, the QPSK modulation circuit 210 has a D flip-flop 214 for synchronizing each bit data consisting of the I signal received by the input terminal 211 with the bit clock signal BCK and a D flip-flop 215 for synchronizing each bit data consisting of the Q signal received by the input terminal 212 with the clock signal BCK.

It is to be noted that to data terminals D of the D flip-flops 214 and 215, the I signal and the Q signal received by the input terminals 211 and 212 are applied, respectively. Further, to clock signal terminals CK of the D flip-flops 214 and 215, the bit clock signal BCK received by the input terminal 213 is applied.

Further, the QPSK modulation circuit 210 has a low-pass filter 216 for limiting a frequency band in order to remove an unnecessary high-frequency-band signal from the I signal output from the D flip-flop 214 and a low-pass filter 217 for limiting a frequency band in order to remove an unnecessary high-frequency-band signal from the Q signal output from the D flip-flop 215.

Further, the QPSK modulation circuit 210 has an oscillator 218 for generating a carrier signal Sc, an amplifier 219 for amplifying the carrier signal Sc generated by this oscillator 218, and a π/4 radian phase shifter 221 and a −π/4 radian phase shifter 222 for shifting a phase of the carrier signal Sc amplified by this amplifier 219 by 45 degrees (π/4) and −45 degrees (−π/4) to obtain first and second carrier signals Sc1 and Sc2, respectively. In this case, the first carrier signal Sc1 and the second carrier signal Sc2 have a phase difference of 90 degrees with respect to each other.

Further, the QPSK modulation circuit 210 has a mixer circuit 223 as accumulation means for accumulating the I signal, which is band-limited through the low-pass filter 216, and the carrier signal Sc1 generated by the π/4 radian phase shifter 221. The QPSK modulation circuit 210 has a mixer circuit 224 as accumulation means for accumulating the Q signal, which is band-limited through the low-pass filter 217, and the carrier signal Sc2 generated by the −π/4 radian phase shifter 222. These mixer circuits 223 and 224 each constitute a two-phase shift keying modulation circuit.

Further, the QPSK modulation circuit 210 has an adder 225 for adding up output signals of the mixer circuits 223 and 224 to obtain a modulated QPSK signal $S_{QM}$ as a modulated quadrature signal and an output terminal 226 for outputting this modulated QPSK signal $S_{QM}$.

The following will describe operations of the QPSK modulation circuit 210 shown in FIG. 1.

The I signal (first-channel digital signal) input to the input terminal 211 is applied to the data terminal D of the D flip-flop 214. The Q signal (second-channel digital signal) input to the input terminal 212, on the other hand, is applied to the data terminal D of the D flip-flop 215. To the clock signal terminals CK of these D flip-flops 214 and 215, the bit clock signal BCK from the input terminal 213 is input.

The D flip-flops 214 and 215 sequentially latch items of bit data of the respective I and Q signals using the bit clock signal BCK respectively. That is, in the D flip-flops 214 and 215, the items of bit data of the respective I and Q signals are synchronized with the bit clock signal BCK.

The I signal and the Q signal output from the respective D flip-flops 214 and 215 are band-limited in the low-pass filters 216 and 217 to remove their unnecessary high-frequency-band signals and then they are input into the mixer circuits 223 and 224, respectively. FIG. 2A shows a frequency spectrum of each of the I signal and the Q signal before they are band-limited by the low-pass filters 216 and 217. FIG. 2B shows a frequency spectrum of each of the I signal and the Q signal after they are band-limited by the low-pass filters 216 and 217. Letters, $f_S$ indicate a bit clock signal frequency, which is a frequency of the bit clock signal BCK.

Further, the carrier signal Sc generated by the oscillator 218 is amplified by the amplifier 219 and then input to the phase shifters 221 and 222. In these phase shifters 221 and 222, the carrier signal Sc has its phase shifted by 45 and −45 degrees to provide the carrier signals Sc1 and Sc2 having a phase difference of 90 degrees with respect to each other.

The carrier signal Sc1 obtained at the phase shifter 221 is input to the mixer circuit 223. This mixer circuit 223 accumulates the I signal band-limited by the low-pass filter 216 and the carrier signal Sc1, to perform two-phase shift keying modulation. The carrier signal Sc2 obtained at the phase shifter 222, on the other hand, is input to the mixer circuit 224. This mixer circuit 224 accumulates the Q signal band-limited by the low-pass filter 217 and the carrier signal Sc2, to perform two-phase shift keying modulation.

Output signals of the mixer circuits 223 and 224 are input to the adder 225 where they are added up. From this adder 225, the modulated QPSK signal $S_{QM}$ as a modulated quadrature signal is obtained and output to the output terminal 226. FIG. 2C shows a frequency spectrum of the modulated QPSK signal $S_{QM}$ output to the output terminal 226. In the figure, letters, $f_0$ indicates a frequency of the carrier signals Sc1 and Sc2.

The following will describe a QPSK demodulation circuit for obtaining the I signal and the Q signal by demodulating the modulated QPSK signal $S_{QM}$ obtained at the QPSK modulation circuit 210 shown in FIG. 1. FIG. 3 shows a configuration of one example of the conventional QPSK demodulation circuit.

This QPSK demodulation circuit 250 has an input terminal 251 receives the modulated QPSK signal $S_{QM}$ and a band-pass filter 252, for removing an unnecessary frequency component from the modulated QPSK signal $S_{QM}$ received by this input terminal 251. This band-pass filter 252 extracts a frequency component in a band of $f_0-f_S$ through $f_0+f_S$ (see FIG. 2C).

Further, the QPSK demodulation circuit 250 has a voltage-controlled oscillator (VCO) 253 for generating the carrier signal Sc, an amplifier 254 for amplifying the carrier signal Sc generated by this oscillator 253, and a π/4 radian phase shifter 261 and a −π/4 radian phase shifter 262 for shifting the phase of the carrier signal Sc amplified by this amplifier 254 by 45 degrees (π/4) and −45 degrees (−π/4) to obtain the first and second carrier signals Sc1 and Sc2, respectively. In this case, the first carrier signal Sc1 and the second carrier signal Sc2 have a phase difference of 90 degrees with respect to each other.

Further, the QPSK demodulation circuit 250 has mixer circuits 263 and 264 each constituting a phase detection circuit. The mixer circuit 263 accumulates the modulated QPSK signal $S_{QM}$ whose unnecessary frequency component has been removed through the band-pass filter 252 and the carrier z signal Sc1 generated by the π/4 radian phase shifter 261 to perform phase detection, thus obtaining a detected first-channel output. The mixer circuit 264, on the other hand, accumulates the modulated QPSK signal $S_{QM}$ whose unnecessary frequency component has been removed through the band-pass filter 252 and the carrier signal Sc2 generated by the −π/4 radian phase shifter 262 to perform phase detection, thus obtaining a detected second-channel output.

Further, the QPSK demodulation circuit 250 has a low-pass filter 265 for limiting a band of a detected output obtained by the mixer circuit 263 to thereby shape its waveform and a low-pass filter 266 for limiting a band of a detected output obtained by the mixer circuit 264 to thereby shape its waveform.

Further, the QPSK demodulation circuit 250 has a bit clock signal reproduction circuit 267. This bit clock signal reproduction circuit 267 obtains from a detected second-channel output whose waveform has been shaped by the low-pass filter 266 a frequency component corresponding to a bit rate of this output, thereby reproducing the bit clock signal BCK. It is to be noted that this bit clock signal reproduction circuit 267 can reproduce the bit clock signal BCK similarly even by using a detected first-channel output whose waveform has been shaped by the low-pass filter 265.

Further, the QPSK demodulation circuit 250 has a D flip-flop 271 for extracting each bit data of the I signal, which is a first-channel digital signal, from a detected output whose band has been limited by the low-pass filter 265. The QPSK demodulation circuit 250 also has a D flip-flop 272 for extracting each bit data of the Q signal, which is a second-channel digital signal, from a detected output whose band has been limited by the low-pass filter 266. The QPSK demodulation circuit 250 further has output terminals 273 and 274 for outputting the bit data extracted by these D flip-flops 271 and 272, as the I signal and the Q signal, respectively.

Further, the QPSK demodulation circuit 250 has mixer circuits 281 and 282, an adder 283, and a low-pass filter 284, each of which constitutes a carrier signal reproduction circuit together with the above-mentioned voltage-controlled oscillator 253.

The mixer circuit 281 accumulates detected outputs whose bands have been limited by the low-pass filters 265 and 266, respectively. The mixer circuit 282 also accumulates detected outputs whose bands have been limited by the low-pass filters 265 and 266, respectively. The adder 283 adds up output signals of the mixer circuits 281 and 282. The low-pass filter 284 limits a band of an added-up signal obtained at the adder 283 to thereby extract a control voltage CNT to be input to the voltage-controlled oscillator 253. By controlling an oscillated frequency of the voltage-controlled oscillator 253 by using the above-mentioned control voltage CNT, a frequency of the carrier signal Sc generated by the voltage-controlled oscillator 253 corresponds to a carrier signal frequency of the modulated QPSK signal $S_{QM}$ to be input to the input terminal 251.

The following will describe operations of the QPSK demodulation circuit 250 shown in FIG. 3.

The modulated QPSK signal $S_{QM}$ received by the input terminal 251 has its unnecessary frequency component removed by the band-pass filter 252 and is then input to the mixer circuits 263 and 264. The amplifier 254 amplifies a carrier signal Sc generated by the voltage-controlled oscillator 253. The carrier signal Sc thus amplified is input to the phase shifters 261 and 262. At these phase shifters 261 and 262, the carrier signal Sc has its phase shifted by 45 degrees and −45 degrees to provide carrier signals Sc1 and Sc2, respectively, having a phase difference of 90 degrees with respect to each other.

The carrier signal Sc1 obtained at the phase shifter 261 is input to the mixer circuit 263. At this mixer circuit 263, the modulated QPSK signal $S_{QM}$ whose unnecessary frequency component has been removed by the band-pass filter 252 and the carrier signal Sc1 are accumulated to perform phase detection, thereby obtaining a detected first-channel output.

Similarly, the carrier signal Sc2 obtained at the phase shifter 262 is input to the mixer circuit 264. At this mixer circuit 264, the modulated QPSK signal $S_{QM}$ whose unnecessary frequency component has been removed by the band-pass filter 252 and the carrier signal Sc2 are accumulated to perform phase detection, thereby obtaining a detected second-channel output.

The detected outputs obtained at these mixer circuits 263 and 264 have their bands limited by the low-pass filters 265 and 266 and are then input to the data terminals D of the D flip-flops 271 and 272, respectively. The clock signal terminals CK of these D flip-flops 271 and 272 are each supplied with the bit clock signal BCK reproduced by the bit clock signal reproduction circuit 267 based on the detected output whose band has been limited by the low-pass filter 266.

The D flip-flops 271 and 272 latch the detected first-channel and second-channel outputs whose bands have been limited by the low-pass filters 265 and 266, respectively, using the bit clock signal BCK, thereby sequentially extracting items of bit data consisting of the respective I signal (first-channel digital signal) and the Q signal (second-channel digital signal). The items of bit data extracted at these D flip-flops 271 and 272 are output to the output terminals 273 and 274 as the I signal and the Q signal, respectively.

Further, the detected first-channel and second-channel outputs whose bands have been limited by the low-pass filters 265 and 266 respectively are input to the mixer circuit 281 as well as to the mixer circuit 282. At the mixer circuits 281 and 282, each of the detected first-channel output and the second-channel output is accumulated.

Output signals of these mixer circuits 281 and 282 are added up at the adder 283, whose output has its band limited at the low-pass filter 284 and is input as the control voltage CNT to the voltage-controlled oscillator 253. Accordingly, the frequency of the carrier signal Sc generated by the voltage-controlled oscillator 253 corresponds to the carrier signal frequency of the modulated QPSK signal $S_{QM}$ input to the input terminal 251, so that as described above the I signal and the Q signal can be obtained well by demodulating the modulated QPSK signal $S_{QM}$.

The modulated QPSK signal $S_{QM}$ obtained by the QPSK modulation circuit 210 shown in FIG. 1 contains no carrier signal components, so that the QPSK demodulation circuit 250 shown in FIG. 3 for demodulating this modulated QPSK signal $S_{QM}$ is provided with a carrier signal generation circuit which is constituted of the mixer circuits 281 and 282, the adder 283, the low-pass filter 284, and the voltage-controlled oscillator 253.

This carrier signal generation circuit, however, may in principle generate a pseudo-demodulation carrier signal, which leads to malfunctioning. Further, if this carrier signal generation circuit is used, the number of the mixer circuits used in the demodulation circuit 250 increases, thus complicating a circuit configuration. Furthermore, if the frequency of the carrier signal is high, delays in the circuit elements prevent the carrier signal from being reproduced, thereby disabling the demodulation.

It is an object of the present invention to stably obtain a demodulation carrier signal and a demodulation bit clock signal with a simple configuration and without difficulty when demodulating a modulated digital signal, for example, a modulated QPSK signal.

SUMMARY OF THE INVENTION

According to the present invention, the foregoing object is attained by a digital modulation circuit comprising carrier signal generator for generating a carrier signal, adder for adding to a digital signal having a predetermined bit rate a bit clock signal having a frequency corresponding to this predetermined bit rate, and accumulator for accumulating an output signal of the adder and a carrier signal generated by the carrier signal generator, to obtain a modulated digital signal.

In accordance with another aspect of the invention, a digital modulation method comprises a carrier signal generation step of generating a carrier signal, an addition step of adding to a digital signal having a predetermined bit rate a bit clock signal having a frequency corresponding to the predetermined bit rate; and an accumulation step of accumulating a signal obtained by the addition step and a carrier signal generated by the carrier signal generation step, to obtain a modulated digital signal.

According to the present invention, to a digital signal having a predetermined bit rate, a bit clock signal having a frequency that corresponds to this predetermined bit rate is added. The added-up signal thus obtained and a carrier signal are accumulated to obtain a modulated digital signal.

This modulated digital signal contains a first frequency signal whose frequency is a sum of first and second frequencies and a second frequency signal whose frequency is a difference between the first and second frequencies, where the first frequency is the frequency of the bit clock signal and the second frequency is a frequency of the carrier signal.

Therefore, when demodulating this modulated digital signal, using these first and second frequency signals allows a demodulation carrier signal and a demodulation bit clock signal to be stably obtained with a simple configuration and without difficulty.

In accordance with further aspect of the invention, another digital modulation circuit comprises carrier signal generator for generating a first carrier signal and a second carrier signal. The carrier signals have a phase difference of 90 degrees with respect to each other. The digital modulation circuit also comprises first accumulator for accumulating a first-channel digital signal having a predetermined bit rate and the first carrier signal generated by the carrier signal generator, first adder for adding to a second-channel digital signal having the predetermined bit rate a bit clock signal having a frequency corresponding to this predetermined bit rate, and second accumulator for accumulating an output signal of this first adder and the second carrier signal generated by the carrier signal generator. The digital modulation circuit further comprises second adder for adding up an output signal of the first accumulator and an output signal of the second accumulator to thereby obtain a modulated quadrature signal.

In accordance with additional aspect of the invention, another digital modulation method comprises a carrier signal generation step of generating a first carrier signal and a second carrier signal that have a phase difference of 90 degrees with respect to each other; a first accumulation step of accumulating a first-channel digital signal having a predetermined bit rate and the first carrier signal generated by the carrier signal generation step, and a first addition step of adding to a second-channel digital signal having the predetermined bit rate a bit clock signal having a frequency corresponding to this predetermined bit rate. This digital modulation method also comprises a second accumulation step of accumulating a signal obtained by this first addition step and the second carrier signal obtained by the carrier signal generation step; and a second addition step of adding up a signal obtained by the first accumulation step and a signal obtained by the second accumulation step to thereby obtain a modulated quadrature signal.

According to the present invention, to the first-channel digital signal having a predetermined bit rate, a bit clock signal having a frequency that corresponds to this predetermined bit rate is added. The added-up signal and the first carrier signal are accumulated. Further, the second-channel digital signal having the predetermined bit rate and a second carrier signal having a phase difference of 90 degrees from the first carrier signal are accumulated. These two accumulated signals are added up to obtain a modulated quadrature signal (modulated digital signal).

This modulated quadrature signal contains a first frequency signal whose frequency is a sum of first and second frequencies and a second frequency signal whose frequency is a difference between the first and second frequencies, where the first frequency is the frequency of the bit clock signal and the second frequency is a frequency of the carrier signal.

Therefore, using these first and second frequency signals allows a demodulation carrier signal and a demodulation bit clock signal to be stably obtained with a simple configuration and without difficulty when demodulating this modulated quadrature signal.

In accordance with still further aspect of the invention, there provides a circuit for generating a demodulation carrier signal that is used when demodulating a modulated digital signal containing a first frequency signal whose frequency is a sum of first and second frequencies and a second frequency signal whose frequency is a difference between the first and second frequencies, where the first frequency is a frequency of a bit clock signal and the second frequency is a frequency of a carrier signal. This circuit comprises accumulator for accumulating modulated first and second signals obtained by branching the modulated digital signal, and carrier signal generator for dividing a frequency of a frequency signal, which is contained in an output signal of this accumulator, having twice the frequency of the carrier signal, to obtain the demodulation carrier signal having the same frequency as that of the carrier signal.

In accordance with still another aspect of the invention, there provides a method of generating a demodulation carrier signal that is used when demodulating a modulated digital signal containing a first frequency signal whose frequency is a sum of first and second frequencies and a second frequency signal whose frequency is a difference between the first and second frequencies, where the first frequency is a frequency of a bit clock signal and the second frequency is a frequency of a carrier signal. This method comprises an accumulation step of accumulating modulated first and second signals obtained by branching the modulated digital signal; and a carrier signal generation step of dividing a frequency of a frequency signal having twice the frequency of the carrier signal contained in a signal obtained by this accumulation step, to obtain the demodulation carrier signal having the same frequency as that of the carrier signal.

According to the present invention, if a frequency of a bit clock signal is the first frequency and that of a carrier signal is a second frequency, a modulated digital signal is handled which contains a first frequency signal whose frequency is a sum of the first and second frequencies and a second frequency signal whose frequency is a difference between the first and second frequencies.

By branching this modulated digital signal, modulated first and second signals are obtained. These modulated first and second signals are accumulated. A resultant accumulated signal contains a frequency signal having twice the frequency of the carrier signal and a frequency signal having twice the frequency of the bit clock signal. From this accumulated signal, the frequency signal having twice the frequency of the carrier signal is taken out, a frequency of which frequency signal is divided by two to obtain a demodulation carrier signal.

Using first and second frequency signals, which are contained in a modulated digital signal, having frequencies that are a sum of a frequency of a bit clock signal and a frequency of a carrier signal and a difference between the two respectively, allows a demodulation carrier signal to be obtained, thereby stably obtaining the demodulation carrier signal easily by using a simple configuration.

In accordance with further aspect of the invention, there provides a circuit for generating a demodulation bit clock signal that is used when demodulating a modulated digital signal containing a first frequency signal whose frequency is a sum of first and second frequencies and a second frequency signal whose frequency is a difference between the first and second frequencies, where the first frequency is a frequency of a bit clock signal and the second frequency is a frequency of a carrier signal. The circuit comprises accumulator for accumulating modulated first and second signals obtained by branching the modulated digital signal, and bit clock signal generator for dividing a frequency of a frequency signal having twice the frequency of the bit clock signal contained in an output signal of the accumulator, to obtain the demodulation bit clock signal having the same frequency as that of the bit clock signal.

In accordance with still further aspect of the invention, there provides a method for generating a demodulation bit clock signal that is used when demodulating a modulated digital signal containing a first frequency signal whose frequency is a sum of first and second frequencies and a second frequency signal whose frequency is a difference between the first and second frequencies, where the first frequency is a frequency of a bit clock signal and the second frequency is a frequency of a carrier signal. The method comprises an accumulation step of accumulating modulated first and second signals obtained by branching the modulated digital signal, and a bit clock signal generation step of dividing a frequency of a frequency signal having twice the frequency of the bit clock signal contained in a signal obtained by this accumulation step, to obtain the demodulation bit clock signal having the same frequency as that of the bit clock signal.

According to the present invention, if a frequency of a bit clock signal is a first frequency and that of a carrier signal is a second frequency, a modulated digital signal is handled which contains a first frequency signal whose frequency is a sum of the first and second frequencies and a second frequency signal whose frequency is a difference between the first and second frequencies.

By branching this modulated digital signal, modulated first and second signals are obtained. These modulated first and second signals are accumulated. A resultant accumulated signal contains a frequency signal having twice the frequency of the carrier signal and a frequency signal having twice the frequency of the bit clock signal. From this accumulated signal, the frequency signal having twice the frequency of the bit clock signal is taken out, a frequency of which frequency signal is then divided by two to obtain a demodulation bit clock signal.

Thus, using first and second frequency signals, which are contained in a modulated digital signal, whose frequencies are a sum of a frequency of a bit clock signal and a frequency of a carrier signal and a difference between the two, respectively, allows a demodulation bit clock signal to be stably obtained with simple configuration and without difficulty.

In accordance with additional aspect of the invention, there provides a digital demodulation circuit for demodulating a modulated quadrature signal containing a first frequency signal whose frequency is a sum of first and second frequencies and a second frequency signal whose frequency is a difference between the first and second frequencies, where the first frequency is a frequency of a bit clock signal and the second frequency is a frequency of a carrier signal. This circuit comprises first accumulator for accumulating modulated first and second signals obtained by branching the modulated quadrature signal, and first frequency divider for dividing a frequency of a frequency signal having twice the frequency of the carrier signal contained in an output signal of this first accumulator, to obtain a frequency signal having the same frequency as that of the carrier signal. The circuit also comprises carrier signal generator for generating a first carrier signal and a second carrier signal based on the frequency signal obtained by this first frequency divider. The carrier signals have a phase difference of 90 degrees with respect to each other. The circuit further comprises second accumulator for accumulating the modulated quadrature signal and the first carrier signal generated by the carrier signal generator, to obtain a detected output of first channel, and third accumulator for accumulating the modulated quadrature signal and the second carrier signal generated by the carrier signal generator, to obtain a detected output of second channel.

In accordance with still additional aspect of the invention, there provides a digital demodulation method of demodulating a modulated quadrature signal containing a first frequency signal whose frequency is a sum of first and second frequencies and a second frequency signal whose frequency is a difference between the first and second frequencies, where the first frequency is a frequency of a bit clock signal and the second frequency is a frequency of a carrier signal. The method comprises a first accumulation step of accumulating modulated first and second signals obtained by branching the modulated quadrature signal, and a frequency division step of dividing a frequency of a frequency signal having twice the frequency of the carrier signal contained in a signal obtained by this first accumulation step, to obtain a frequency signal having the same frequency as that of the carrier signal.

The method also comprises a carrier signal generation step of generating a first carrier signal and a second carrier signal having a phase difference of 90 degrees with respect to each other based on the frequency signal obtained by this frequency division step, a second accumulation step of accumulating the modulated quadrature signal and the first carrier signal generated by the carrier signal generation step, to obtain a detected output of first channel, and a third accumulation step of accumulating the modulated quadrature signal and the second carrier signal generated by the carrier signal generation step, to obtain a detected output of second channel.

According to the present invention, if a frequency of a bit clock signal is the first frequency and that of a carrier signal is the second frequency, a modulated digital signal is handled which contains a first frequency signal whose frequency is a sum of the first and second frequencies and a second frequency signal whose frequency is a difference between the first and second frequencies.

By branching this modulated digital signal, modulated first and second signals are obtained. These modulated first and second signals are accumulated. A resultant accumulated signal contains a frequency signal having twice the frequency of the carrier signal and a frequency signal having twice the frequency of the bit clock signal. From this accumulated signal, the frequency signal having twice the frequency of the carrier signal is taken out, a frequency of which frequency signal is divided by two to obtain a demodulation carrier signal.

From this demodulation carrier signal, a first carrier signal and a second carrier signal having a phase difference of 90 degrees with respect to the first carrier signal are obtained. The modulated quadrature signal and the first carrier signal are accumulated to obtain the detected output of the first channel. On the other hand, the modulated quadrature signal and the second carrier signal are accumulated to obtain the detected output of the second channel.

From these detected outputs of the first and second channels, items of bit data consisting of first-channel and second-channel digital signals are sequentially extracted using a frequency signal (demodulation bit clock signal) having the same frequency as that of the bit clock signal.

This demodulation bit clock signal is obtained by dividing by two a frequency of a frequency signal having twice the frequency of the bit clock signal and taken out from, for example, an accumulated signal obtained by accumulating the above-mentioned modulated first and second signals.

The above-mentioned detected outputs of first-channel and second-channel contain a frequency signal having the same frequency as that of the bit clock signal. The above-mentioned demodulation bit clock signal is obtained by taking out the above-mentioned frequency signal having the same frequency as that of the bit clock signal from, for example, this detected output of first channel or second channel.

Thus, using first and second frequency signals, which are contained in a modulated digital signal, having frequencies on a sum of a frequency of a bit clock signal and a frequency of a carrier signal and a difference between them allows a demodulation carrier signal and a demodulation bit clock signal to be stably obtained with simple configuration and without difficulty.

In accordance with further aspect of the invention, there provides another circuit for generating a demodulation carrier signal that is used when demodulating a modulated quadrature signal containing a first frequency signal whose frequency is a sum of first and second frequencies and a second frequency signal whose frequency is a difference between the first and second frequencies, where the first frequency is a frequency of a bit clock signal and the second frequency is a frequency of a carrier signal. This circuit comprises voltage-controlled oscillator for generating the demodulation carrier signal having the same frequency as that of the carrier signal, frequency generator for generating third and fourth frequency signals having a phase difference of 90 degrees with respect to each other based on an output signal of this voltage-controlled oscillator, and first accumulator for accumulating the modulated quadrature signal and the third frequency signal generated by the frequency generator. This circuit also comprises second accumulator for accumulating the modulated quadrature signal and the fourth frequency signal generated by the frequency generator, first filter for extracting from an output signal of the first accumulator a frequency signal in a predetermined range having the frequency of the bit clock signal as its center frequency, second filter for extracting from an output signal of the second accumulator a frequency signal in a predetermined range having the frequency of the bit clock signal as its center frequency. The circuit further comprises third accumulator for accumulating an output signal of the first filter and that of the second filter, and third filter for limiting a band of an output signal of this third accumulator, to obtain a control voltage for the voltage-controlled oscillator.

In accordance with still further aspect of the invention, there provides a method for generating a demodulation carrier signal that is used when demodulating a modulated quadrature signal containing a first frequency signal whose frequency is a sum of first and second frequencies and a second frequency signal whose frequency is a difference between the first and second frequencies, where the first frequency is a frequency of a bit clock signal and the second frequency is a frequency of a carrier signal. The method comprises a frequency generation step of generating third and fourth frequency signals having a phase difference of 90 degrees with respect to each other based on an output signal of a voltage-controlled oscillator for generating a demodulation carrier signal having the same frequency as that of the carrier signal. The method also comprises a first accumulation step of accumulating the modulated quadrature signal and the third frequency signal generated by the frequency generation step, a second accumulation step of accumulating the modulated quadrature signal and the fourth frequency signal generated by the frequency generation step, a first extraction step of extracting from a signal obtained by the first accumulation step a frequency signal in a predetermined range having the frequency of the bit clock signal as its center frequency, and a second extraction step of extracting from a signal obtained by the second accumulation step a frequency signal in a predetermined range having the frequency of the bit clock signal as its center frequency. The method further comprises a third accumulation step of accumulating the frequency signal extracted by the first extraction step and the frequency signal extracted by the second extraction step, and a third extraction step of limiting a band of a signal obtained by this third accumulation step, to extract a control voltage for the voltage-controlled oscillator.

According to the present invention, if a frequency of a bit clock signal is the first frequency and that of a carrier signal is the second frequency, a modulated quadrature signal (modulated digital signal) is handled which contains a first frequency signal whose frequency is a sum of the first and second frequencies and a second frequency signal whose frequency is a difference between the first and second frequencies.

Based on an output signal of a voltage-controlled oscillator for generating a demodulation carrier signal having the same frequency as that of the carrier signal, third and fourth frequency signals having a phase difference of 90 degrees with respect to each other is generated.

The modulated quadrature signal and the third frequency signal are accumulated and the modulated quadrature signal and the fourth frequency signal are accumulated. Accumulated signals thus obtained each contain a frequency signal that corresponds to the frequency of the above-mentioned bit clock signal, a frequency of which frequency signal fluctuates corresponding to fluctuations of the above-mentioned demodulation carrier signal. From each of these accumulated signals, a frequency signal in a predetermined range having the frequency of the bit clock signal as its center frequency is extracted.

The frequency signals extracted from the accumulated signals respectively are accumulated and a band of a resultant accumulated signal is limited to obtain a control voltage for the voltage-controlled oscillator. This control voltage corresponds to a frequency difference between a carrier signal of the modulated quadrature signal and a demodulation carrier signal generated by the voltage-controlled oscillator. Therefore, by inputting this control voltage to the voltage-controlled oscillator, it is possible to obtain a demodulation carrier signal that has the same frequency as that of the carrier signal of the modulated quadrature signal.

Thus, using first and second frequency signals, which are contained in a modulated digital signal, having frequencies on a sum of a frequency of a bit clock signal and a frequency of a carrier signal and a difference between them allows a demodulation carrier signal and a demodulation carrier signal to be stably obtained with simple configuration and without difficulty.

In accordance with additional aspect of the invention, there provides another digital demodulation circuit for demodulating a modulated quadrature signal containing a first frequency signal whose frequency is a sum of first and second frequencies and a second frequency signal whose frequency is a difference between the first and second frequencies, where the first frequency is a frequency of a bit clock signal and the second frequency is a frequency of a carrier signal. The digital demodulation circuit comprises voltage-controlled oscillator for generating a frequency signal having the same frequency as that of the carrier signal, carrier signal generator for generating first and second carrier signals having a phase difference of 90 degrees with respect to each other based on an output signal of the voltage-controlled oscillator, and first accumulator for accumulating the modulated quadrature signal and the first carrier signal generated by the carrier signal generator, to obtain a detected output of first channel. The digital demodulation circuit also comprises second accumulator for accumulating the modulated quadrature signal and the second carrier signal generated by the carrier signal generator, to obtain a detected output of second channel, first filter for extracting a frequency signal in a predetermined range having as its center frequency the frequency of the bit clock signal from the detected output of the first channel obtained by the first accumulator, second filter for extracting a frequency signal in a predetermined range having as its center frequency the frequency of the bit clock signal from the detected output of the second channel obtained by the second accumulator. The digital demodulation circuit further comprises third accumulator for accumulating an output signal of the first filter and an output signal of the second filter, and third filter for limiting a band of an output signal of the third accumulator, to extract a control voltage for the voltage-controlled oscillator.

In accordance with additional aspect of the invention, there provides another digital modulation method for demodulating a modulated quadrature signal containing a first frequency signal whose frequency is a sum of first and second frequencies and a second frequency signal whose frequency is a difference between the first and second frequencies, where the first frequency is a frequency of a bit clock signal and the second frequency is a frequency of a carrier signal. The digital modulation method comprises a carrier signal generation step of generating first and second carrier signals having a phase difference of 90 degrees with respect to each other based on an output signal of a voltage-controlled oscillator for generating a frequency signal having the same frequency as that of the carrier signal. The digital modulation method also comprises a first accumulation step of accumulating the modulated quadrature signal and the first carrier signal generated by the carrier signal generation step, to obtain a detected output of first channel, a second accumulation step of accumulating the modulated quadrature signal and the second carrier signal generated by the carrier signal generation step, to obtain a detected output of second channel, a first extraction step of extracting from the detected output of the first channel obtained by the first accumulation step a frequency signal in a predetermined range having the frequency of the bit clock signal as its center frequency, and a second extraction step of extracting from the detected output of the second channel obtained by the second accumulation step a frequency signal in a predetermined range having the frequency of the bit clock signal as its center frequency. The digital modulation method further comprises a third accumulation step of accumulating the frequency signal extracted by the first extraction step and the frequency signal extracted by the second extraction step, and a third extraction step of limiting a band of a signal obtained by the third accumulation step, to extract a control voltage for the voltage-controlled oscillator.

According to the present invention, if a frequency of a bit clock signal is the first frequency and that of a carrier signal is the second frequency, a modulated quadrature signal (modulated digital signal) is handled which contains a first frequency signal whose frequency is a sum of the first and second frequencies and a second frequency signal whose frequency is a difference between the first and second frequencies.

Based on an output signal of a voltage-controlled oscillator for generating a frequency signal (demodulation carrier signal) having the same frequency as that of the carrier signal, first and second carrier signals having a phase difference of 90 degrees with respect to each other are generated. The modulated quadrature signal and the first carrier signal are accumulated to obtain a detected output of the first channel. On the other hand, the modulated quadrature signal and the second carrier signal are accumulated to obtain a detected output of the second channel.

These detected outputs of the first and second channels contain a frequency signal that corresponds to the frequency of the above-mentioned bit clock signal, a frequency of which frequency signal fluctuates corresponding to fluctuations of the above-mentioned demodulation carrier signal. From each of these accumulated signals, a frequency signal in a predetermined range having the frequency of the bit clock signal as its center frequency is extracted.

The frequency signals extracted from the detected outputs respectively are accumulated and a band of a resultant accumulated signal is limited to obtain a control voltage for the voltage-controlled oscillator. This control voltage corresponds to a frequency difference between a carrier signal of the modulated quadrature signal and a demodulation carrier signal generated by the voltage-controlled oscillator. Therefore, by inputting this control voltage to the voltage-controlled oscillator, it is possible to obtain a demodulation carrier signal that has the same frequency as that of the carrier signal of the modulated quadrature signal.

From the above-mentioned detected outputs of the first and second channels, items of bit data of first-channel and second-channel digital signals are sequentially extracted using a frequency signal (demodulation bit clock signal) having the same frequency as that of the bit clock signal.

This demodulation bit clock signal is obtained by dividing by two a frequency of a frequency signal having twice the frequency of the bit clock signal and taken out from, for example, an accumulated signal obtained by accumulating the modulated first and second signals obtained by branching the modulated quadrature signal.

The above-mentioned detected outputs of the first and second channels contain a frequency signal having the same frequency as that of the bit clock signal. The above-mentioned demodulation bit clock signal is obtained by taking out the above-mentioned frequency signal having the same frequency as that of the bit clock signal from, for example, this detected output of first channel or second channel.

Thus, using first and second frequency signals, which are contained in a modulated digital signal, having frequencies on a sum of a frequency of a bit clock signal and a frequency of a carrier signal and a difference between them allows a demodulation carrier signal and a demodulation bit clock signal to be stably obtained with simple configuration and without difficulty.

The concluding portion of this specification particularly points out and directly claims the subject matter of the present invention. However, those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIGS. 5A-5D are diagrams each showing frequency spectra of various portions of the QPSK modulation circuit;

FIG. 8 is a block diagram for showing a configuration of further embodiment of QPSK demodulation circuit according to the invention; and FIG. 9 is a block diagram for showing a configuration of still further embodiment of QPSK demodulation circuit according to the invention.

DESCRIPTION OF THE PREFERRED EMBODIMENTS

Figure 4:
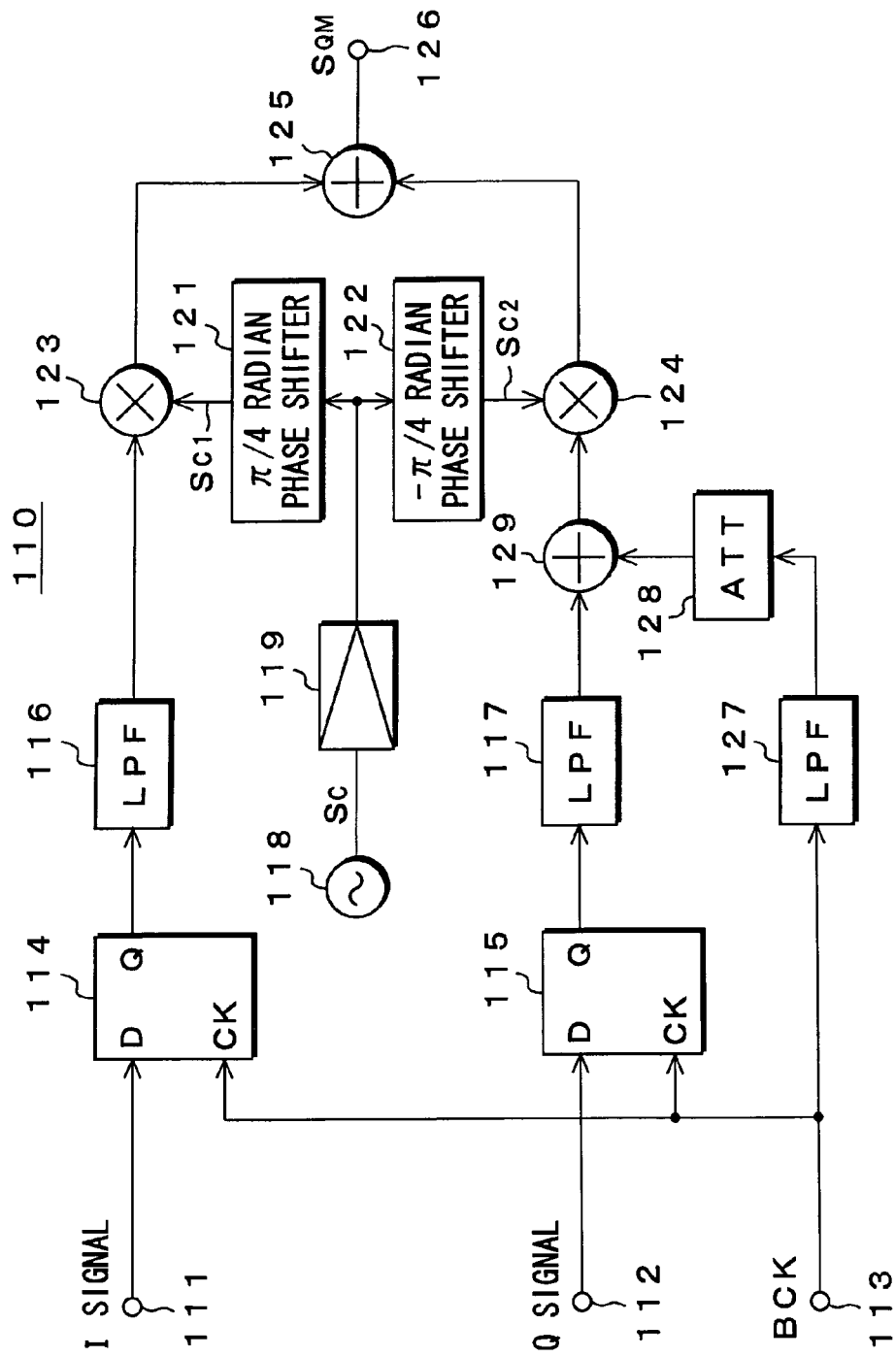
FIG. 4 is a block diagram for showing a configuration of an embodiment of QPSK modulation circuit according to the invention.

The following will describe preferred embodiments of the present invention. FIG. 4 shows a configuration of a QPSK modulation circuit 110 according to an embodiment of the invention.

This QPSK modulation circuit 110 comprises an input terminal 111 for receiving an I signal as a digital signal for first channel, an input terminal 112 for receiving a Q signal as a digital signal for second channel, and an input terminal 113 for receiving a bit clock signal BCK having a frequency that corresponds to a bit rate of the I or Q signal. In the present embodiment, the frequency of the bit clock signal BCK is, for example, 1 GHz.

The QPSK modulation circuit 110 also comprises a D flip-flop 114 for synchronizing each bit data constituting the I signal received by the input terminal 111 with the bit clock signal BCK and a D flip-flop 115 for synchronizing each bit data constituting the Q signal received by the input terminal 112 with the clock signal BCK.

It is to be noted that to data terminals D of the D flip-flops 114 and 115, the I and Q signals received by the input terminals 111 and 112 are applied, respectively. Further, to clock signal terminals CK of the D flip-flops 114 and 115, the bit clock signal BCK received by the input terminal 113 is applied.

The QPSK modulation circuit 110 further comprises a low-pass filter 116 for performing band limitation in order to remove an unnecessary high-frequency-band signal from the I signal output from the D flip-flop 114 and a low-pass filter 117 for performing band limitation in order to remove an unnecessary high-frequency-band signal from the Q signal output from the D flip-flop 115. In the present embodiment, these low-pass filters 116 and 117 extract a frequency component of, for example, 1 GHz or less.

The QPSK modulation circuit 110 still further comprises a low-pass filter 127 for removing a high-frequency component from the bit clock signal BCK received by the input terminal 113 and an attenuator 128 for adjusting a level of an output signal of this low-pass filter 127. This low-pass filter 127 extracts only a fundamental-wave component of the bit clock signal BCK, in this case, a 1-GHz frequency component.

The QPSK modulation circuit 110 additionally comprises an adder 129 for adding the bit clock signal BCK (1-GHz frequency component) whose level has been adjusted by the attenuator 128 to the Q signal whose band has been limited by the low-pass filter 117.

The QPSK modulation circuit 110 still additionally comprises an oscillator 118 for generating a carrier signal Sc, an amplifier 119 for amplifying the carrier signal Sc generated by this oscillator 118, and π/4 radian phase shifter 121 and −π/4 radian phase shifter 122 for shifting a phase of the carrier signal Sc amplified by this amplifier 119 by 45 degrees (π/4) and −45 degrees (−π/4) to obtain first and second carrier signals Sc1 and Sc2, respectively. In this case, the first carrier signal Sc1 and the second carrier signal Sc2 have a phase difference of 90 degrees with respect to each other. In the present embodiment, the carrier signal Sc has a frequency of, for example, 3.5 GHz.

The QPSK modulation circuit 110 further comprises a mixer circuit 123 as accumulation means for accumulating the I signal having its band limited by the low-pass filter 116 and the carrier signal Sc1 obtained by the π/4 radian phase shifter 121 and a mixer circuit 124 as accumulation means for accumulating an added-up signal obtained by the adder 129 and the carrier signal Sc2 obtained by the −π/4 radian phase shifter 122. These mixer circuits 123 and 124 each constitute a two-phase shift keying modulation circuit.

The QPSK modulation circuit 110 still further comprises an adder 125 for adding up output signals of the mixer circuits 123 and 124 to obtain a modulated QPSK signal $S_{QM}$ as a modulated quadrature signal and an output terminal 126 for outputting this modulated QPSK signal $S_{QM}$.

The following will describe operations of the QPSK modulation circuit 110 shown in FIG. 4.

The I signal (first-channel digital signal) received by the input terminal 111 is applied to the data terminal D of the D flip-flop 114. The Q signal (second-channel digital signal) received by the input terminal 112, on the other hand, is applied to the data terminal D of the D flip-flop 115. To the clock signal terminals CK of these D flip-flops 114 and 115, the bit clock signal BCK from the input terminal 113 is applied.

The D flip-flops 114 and 115 sequentially latch items of bit data that constitute the respective I and Q signals using the bit clock signal BCK. That is, the D flip-flops 114 and 115 synchronize the items of bit data of the respective I and Q signals with the clock signal BCK.

The I signal output from the D flip-flop 114 has its band limited by the low-pass filter 116 so that its unnecessary high-frequency-band signal may be removed and is then input to the mixer circuit 123. The Q signal output from the D flip-flop 115, on the other hand, has its band limited by the low-pass filter 117 so that its unnecessary high-frequency-band signal may be removed and is then input to the adder 129.

The bit clock signal BCK received by the input terminal 113 has its band limited by the low-pass filter 127 and has its level adjusted by the attenuator 128 and is then input to the adder 129. Through the low-pass filter 127, a high-frequency component is removed from the bit clock signal BCK to extract only a 1-GHz frequency component.

The adder 129 adds up the Q signal from the low-pass filter 117 and the bit clock signal BCK (1-GHz frequency component) from the attenuator 128 and a resultant added-up signal is input to the mixer circuit 124.

FIG. 5A shows a frequency spectrum of the I or Q signal before the band thereof is limited by the low-pass filter 116 or 117. FIG. 5B shows a frequency spectrum of the I signal which has its band limited by the low-pass filter 116 and is input to the mixer circuit 123. FIG. 5C shows a frequency spectrum of an added-up signal which is obtained by adding the bit clock signal BCK (fundamental-wave component, in this case, 1-GHz frequency component) to the Q signal having its band limited by the low-pass filter 117 and input from the adder 129 to the mixer circuit 124. In the figures, $f_S$ indicates the frequency of the bit clock signal BCK and is 1 GHz ($F_S=1$ GHz) in the present embodiment.

Further, the amplifier 119 amplifies the carrier signal Sc generated by the oscillator 118. The carrier signal Sc thus amplified is input to the phase shifters 121 and 122. These shifters 121 and 122 shift the phase of the carrier signal Sc by 45 degrees and −45 degrees, to thereby obtain the carrier signals Sc1 and Sc2 having a phase difference of 90 degrees with respect to each other.

The carrier signal Sc1 obtained by the phase shifter 121 is input to the mixer circuit 123. This mixer circuit 123 accumulates the I signal whose band has been limited by the low-pass filter 116 and the carrier signal Sc1, thus performing two-phase shift keying modulation. The carrier signal Sc2 obtained by the phase shifter 122, on the other hand, is input to the mixer circuit 124. This mixer circuit 124 accumulates the added-up signal of the Q signal and the bit clock signal BCK obtained by the adder 129 and the carrier signal Sc2, thus performing two-phase shift keying modulation.

The output signals of the mixer circuits 123 and 124 are input to the adder 125 so that they may be added up. From this adder 125, the modulated QPSK signal $S_{QM}$ as a modulated quadrature signal is obtained and output to the output terminal 126. FIG. 5D shows a frequency spectrum of the modulated QPSK signal $S_{QM}$ output from the output terminal 126. In the figure, $f_0$ indicates a frequency of each of the carrier signals Sc1 and Sc2 and is 3.5 GHz ($f_0=3.5$ GHz) in the present embodiment.

As shown in FIG. 5D, assuming the frequency $f_S$ of the bit clock signal BCK to be a first frequency and the frequency $f_0$ of the carrier signal Sc to be a second frequency, the modulated QPSK signal $S_{QM}$ contains a first frequency signal S1 whose frequency is a sum of the first and second frequencies ($f_0+f_S$) and a second frequency signal S2 whose frequency is a difference between the first and second frequencies ($f_0-f_S$).

In such a manner, the first and second frequency signals S1 and S2 contained in the modulated QPSK signal $S_{QM}$ are obtained by accumulating such a component of the bit clock signal BCK as to have the frequency $f_S$ and the carrier signal Sc2 having the frequency $f_0$ in the mixer circuit 124.

It is to be noted that the component of the frequency $f_S$ of the bit clock signal BCK is expressed as Ss=cos $\omega_s \cdot t$ and the carrier signal Sc2 having the frequency $f_0$ is expressed as Sc2=sin $\omega_0 \cdot t$. In this case, an accumulated signal of these signals Ss and Sc2 is given by following Equation (1), containing a first frequency signal S1 having the frequency ($f_0+f_S$) and a second frequency signal S2 having the frequency ($f_0-f_S$). In the Equation, $\omega_s=2\pi f_S$ and $\omega_0=2 f_0$.

$$\begin{aligned} S_S \cdot S_{C2} &= (\cos \omega_s \cdot t) \cdot (\sin \omega_0 \cdot t) \\ &= 0.5 \cdot \{\sin(\omega_0 \cdot t + \omega_s \cdot t) + \sin(\omega_0 \cdot t - \omega_s \cdot t)\} \\ &= 0.5 \cdot \sin(\omega_0 + \omega_s) \cdot t + 0.5 \cdot \sin(\omega_0 - \omega_s) \cdot t \end{aligned} \quad (1)$$

In such a manner, by the QPSK modulation circuit 110 shown in FIG. 4, it is possible to contain in the modulated QPSK signal $S_{QM}$ the frequency signals S1 and S2 that have the sum of the frequency $f_S$ of the bit clock signal BCK and the frequency $f_0$ of the carrier signal Sc and the difference between them respectively. Therefore, when demodulating this modulated QPSK signal $S_{QM}$, these frequency signals S1 and S2 can be used to stably obtain a demodulation carrier signal and a demodulation bit clock signal easily by using a simple configuration, as described later.

Although in the QPSK modulation circuit 110 shown in FIG. 4, the bit clock signal BCK (fundamental-wave component, in this case, 1-GHz frequency component) has been added to the Q signal having its band limited by the low-pass filter 117, this bit clock signal BCK (1-GHz frequency component) may be added to the I signal having its band limited by the low-pass filter 116. In this case, by accumulation at the mixer circuit 123, the above-mentioned first and second frequency signals S1 and S2 can be obtained.

Although in the QPSK modulation circuit 110 shown in FIG. 4, the ID bit clock signal BCK (1-GHz frequency component) has been added to the Q signal having its band limited by the low-pass filter 117, the bit clock signal BCK may be added to the Q signal before its band is limited by the low-pass filter 117. In this case, the high-frequency component of the bit clock signal BCK can be removed by the low-pass filter 117, so that the low-pass filter 127 can be omitted.

Although in the QPSK modulation circuit 110 shown in FIG. 4, the low-pass filters 116 and 117 have been provided to limit the bands of the I and Q signals respectively, in place of these low-pass filters 116 and 117, a band-pass filter through which a frequency component in a frequency band of $(f_0-f_S)$ through $(f_0+f_S)$ passes may be provided on the output side of the adder 125, for example.

Figure 6:
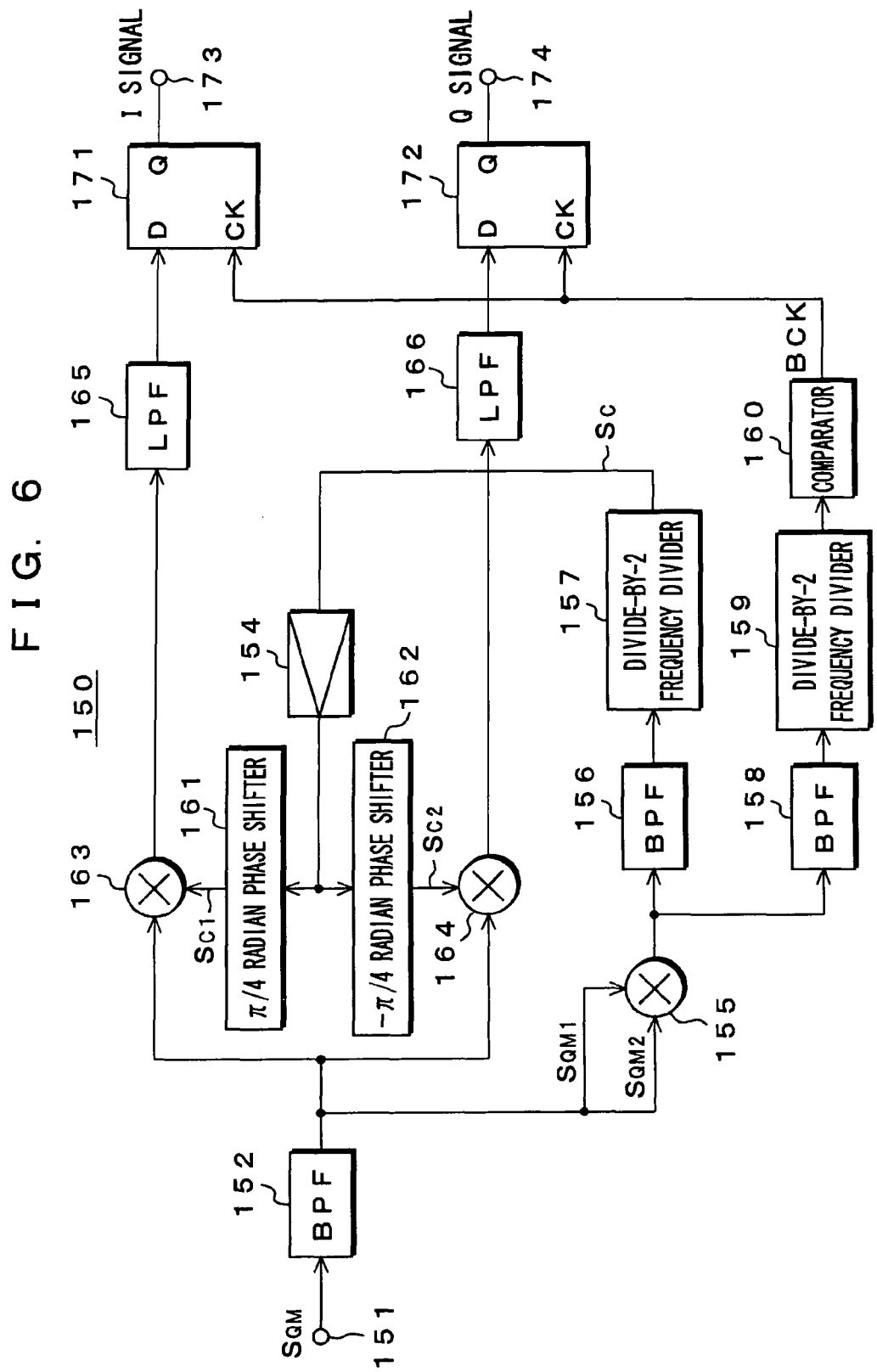
FIG. 6 is a block diagram for showing a configuration of an embodiment of QPSK demodulation circuit according to the invention.

The following will describe a QPSK demodulation circuit for demodulating a modulated QPSK signal $S_{QM}$ obtained by the QPSK modulation circuit 110 shown in FIG. 4, to obtain the I and Q signals. FIG. 6 shows a configuration of a QPSK demodulation circuit 150 according to an embodiment of the invention.

This QPSK demodulation circuit 150 comprises an input terminal 151 for receiving the modulated QPSK signal $S_{QM}$ and a band-pass filter 152 for removing an unnecessary frequency component from the modulated QPSK signal $S_{QM}$ received by this input terminal 151. This band-pass filter 152 extracts a frequency component in a band of $f_0-f_S$ through $f_0+f_S$ (see FIG. 5D).

The QPSK demodulation circuit 150 also comprises a mixer circuit 155 for accumulating a modulated first signal $S_{QM}1$ and a modulated second signal $S_{QM}2$ which are obtained by branching the modulated QPSK signal $S_{QM}$ whose unnecessary frequency component has been removed by the band-pass filter 152. In this case, the modulated signals $S_{QM}1$ and $S_{QM}2$ each contain a first frequency signal S1 having a frequency of $(f_0+f_S)$ and a second frequency signal S2 having a frequency of $(f_0-f_S)$. Therefore, an output signal of this mixer circuit 155 contains a frequency signal having a frequency of $2f_0$ and a frequency signal having a frequency of $2f_S$.

The QPSK demodulation circuit 150 further comprises a band-pass filter 156 for extracting a frequency signal having the frequency $2f_0$, which is contained in an output signal of the mixer circuit 155 and a divide-by-2 frequency divider 157 for dividing by two the frequency signal with the frequency $2f_0$ extracted by this band-pass filter 156, to obtain a frequency signal having a frequency $f_0$ as a demodulation carrier signal Sc.

The QPSK demodulation circuit 150 additionally comprises an amplifier 154 for amplifying the carrier signal Sc (frequency signal having the frequency $f_0$) obtained by this divide-by-2 frequency divider 157 and π/4 radian phase shifter 161 and −π/4 radian phase shifter 162 each for shifting a phase of the carrier signal Sc amplified by this amplifier 154 by 45 degrees (π/4) and −45 degrees (−π/4) to obtain first and second carrier signals Sc1 and Sc2, respectively. In this case, the first carrier signal Sc1 and the second carrier signal Sc2 have a phase difference of 90 degrees with respect to each other.

The QPSK demodulation circuit 150 still further comprises mixer circuits 163 and 164 each of which constitutes a phase detection circuit. The mixer circuit 163 accumulates the modulated QPSK signal $S_{QM}$ whose unnecessary frequency component has been removed through the band-pass filter 152 and the carrier signal Sc1 generated by the π/4 radian phase shifter 161 to perform phase detection, thus obtaining a detected output of first channel. The mixer circuit 164, on the other hand, accumulates the modulated QPSK signal $S_{QM}$ whose unnecessary frequency component has been removed through the band-pass filter 152 and the carrier signal Sc2 generated by the −π/4 radian phase shifter 162 to perform phase detection, thus obtaining a detected output of second channel.

The QPSK demodulation circuit 150 still additionally comprises a low-pass filter 165 for limiting a band of a detected output obtained by the mixer circuit 163 to thereby shape its waveform and a low-pass filter 166 for limiting a band of a detected output obtained by the mixer circuit 164 to thereby shape its waveform. These low-pass filters 165 and 166 extract a frequency component having a frequency not larger than 1 GHz. Although a frequency signal having the frequency $f_S$, that is, a 1-GHz frequency signal in the present embodiment is contained in each of the detected outputs of the mixer circuits 163 and 164, this frequency signal having the frequency $f_S$ is also removed by each of the low-pass filters 165 and 166.

The QPSK demodulation circuit 150 further comprises a band-pass filter 158 for extracting a frequency signal having the frequency $2f_S$, which is contained in the output signal of the mixer circuit 155, a divide-by-2 frequency divider 159 for dividing by two the frequency signal with the frequency $2f_S$ extracted by this band-pass filter 158 to obtain a frequency signal having a frequency $f_S$, and a comparator 160 for comparing the frequency signal (sine-wave signal) having the frequency $f_S$ obtained by this divide-by-2 frequency divider 159 to a 0-level threshold value to convert it into a rectangular-wave signal, thereby obtaining a demodulation bit clock signal BCK.

Further, the QPSK demodulation circuit 150 still further comprises a D flip-flop 171 for extracting each bit data constituting the I signal, which is a first-channel digital signal from a detected output whose band has been limited by the low-pass filter 165, a D flip-flop 172 for extracting each bit data constituting the Q signal, which is a second-channel digital signal from a detected output whose band has been limited by the low-pass filter 166, and output terminals 173 and 174 for outputting items of the bit data extracted by these D flip-flops 171 and 172 as the I signal and the Q signal, respectively.

The following will describe operations of the QPSK demodulation circuit 150 shown in FIG. 6.

The modulated QPSK signal $S_{QM}$ received by the input terminal 151 has its unnecessary frequency component removed by the band-pass filter 152 and is input to the mixer circuits 163 and 164.

Further, the modulated QPSK signal $S_{QM}$ whose unnecessary frequency component has been removed by the band-pass filter 152 branches off to a modulated first signal $S_{QM}1$ and a modulated second signal $S_{QM}2$, which are input to one input terminal and the other input terminal of the mixer circuit 155 where they are accumulated. The output signal of this mixer circuit 155 is input to the band-pass filter 156, which extracts a frequency signal having the frequency $2f_0$ ($f_0$ indicates the frequency of the carrier signal Sc), which is contained in that output signal.

Then, this frequency signal with the frequency $2f_0$ is input to the divide-by-2 frequency divider 157 where its frequency is divided by two to provide a demodulation carrier signal Sc. The amplifier 154 amplifies this carrier signal Sc. The carrier signal Sc thus amplified is input to the phase shifters 161 and 162. At these phase shifters 161 and 162, the carrier signal Sc has its phase shifted by 45 degrees and −45 degrees to provide carrier signals Sc1 and Sc2 having a phase difference of 90 degrees with respect to each other.

The carrier signal Sc1 obtained at the phase shifter 161 is input to the mixer circuit 163. At this mixer circuit 163, the modulated QPSK signal $S_{QM}$ whose unnecessary frequency component has been removed by the band-pass filter 152 and the carrier signal Sc1 are accumulated to perform phase detection, thereby obtaining a detected output of first channel.

Similarly, the carrier signal Sc2 obtained at the phase shifter 162 is input to the mixer circuit 164. At this mixer circuit 164, the modulated QPSK signal $S_{QM}$ whose unnecessary frequency component has been removed by the band-pass filter 152 and the carrier signal Sc2 are accumulated to perform phase detection, thereby obtaining a detected output of second channel. The detected outputs taken out by these mixer circuits 163 and 164 have their bands limited and have their waveform shaped by the low-pass filters 165 and 166 and are then input to the data terminals D of the D flip-flops 171 and 172, respectively.

The output signal of the above-mentioned mixer circuit 155 is input to the band-pass filter 158, which extracts a frequency signal having the frequency $2f_S$ ($f_S$ indicates the frequency of the bit clock signal BCK) from that output signal. This frequency signal with the frequency $2f_S$ is input to the divide-by-2 frequency divider 159 where its frequency is divided by two to provide a frequency signal having the frequency $f_S$. The frequency signal (sine-wave signal) with the frequency $f_S$ is converted into a rectangular-wave signal by the comparator 160, thereby providing a demodulation bit clock signal BCK. This bit clock signal BCK is input to the clock signal terminals CK of the above-mentioned D flip-flops 171 and 172.

The D flip-flops 171 and 172 latch the detected outputs of the first and second channels whose bands have been limited by the low-pass filters 165 and 166 respectively by using the bit clock signal BCK, thereby sequentially extracting each bit data of the respective I signal (first-channel digital signal) and the Q signal (second-channel digital signal). The items of bit data extracted at these D flip-flops 171 and 172 are output to the output terminals 173 and 174 as the I signal and the Q signal, respectively.

In such a manner, the QPSK demodulation circuit 150 shown in FIG. 6 handles the modulated QPSK signal $S_{QM}$ containing the frequency signals S1 and S2 that have the sum of the frequency $f_S$ of the bit clock signal BCK and the frequency $f_0$ of the carrier signal Sc and the difference between them respectively. The QPSK demodulation circuit 150 use these frequency signals S1 and S2 to obtain a demodulation carrier signal Sc and a demodulation bit clock signal BCK. This allows the demodulation carrier signal Sc and the demodulation bit clock signal BCK to be stably obtained with a simple configuration and without difficulty.

Figure 1:
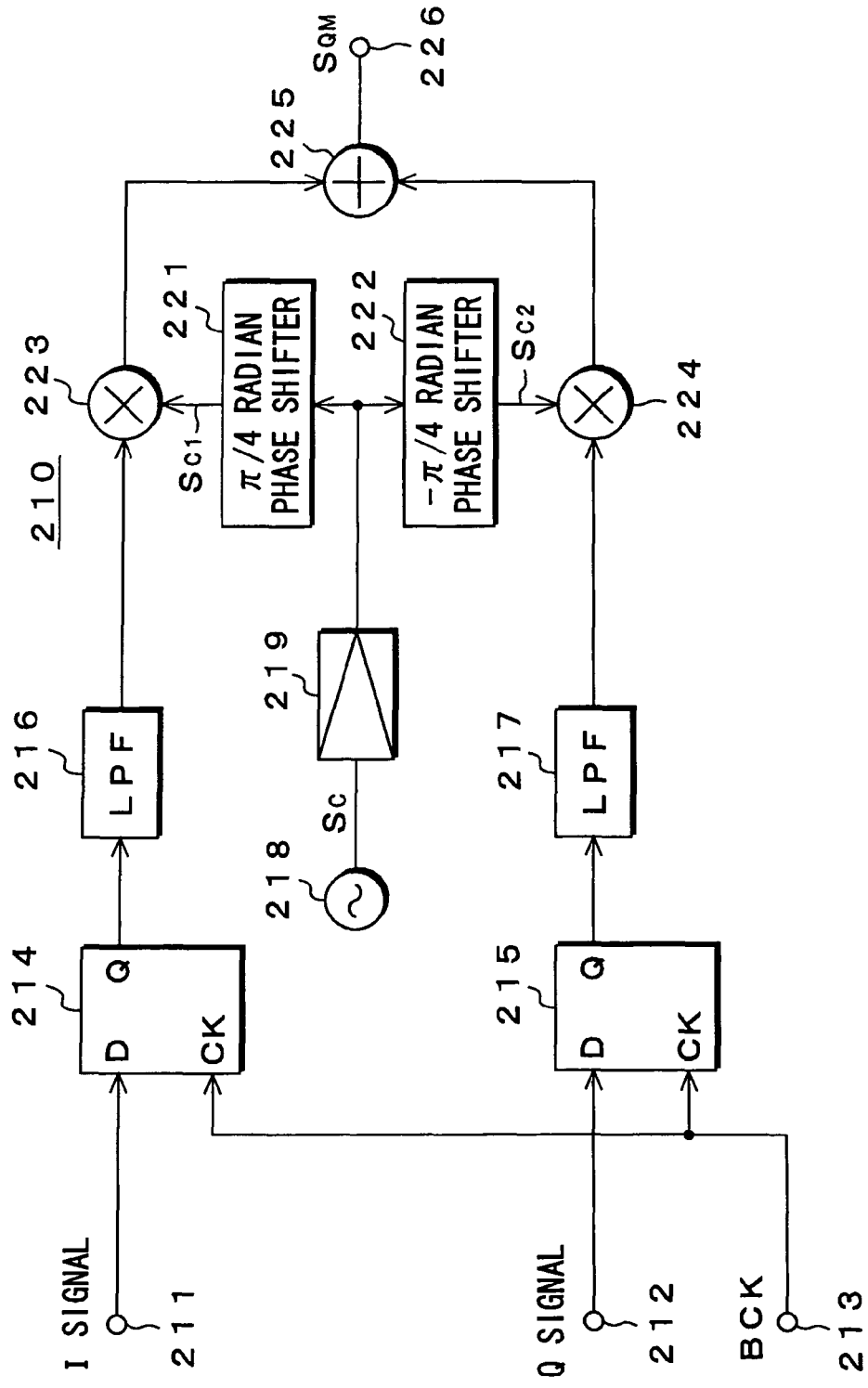
FIG. 1 is a block diagram for showing a configuration example of a conventional QPSK modulation circuit.
Figure 2A:
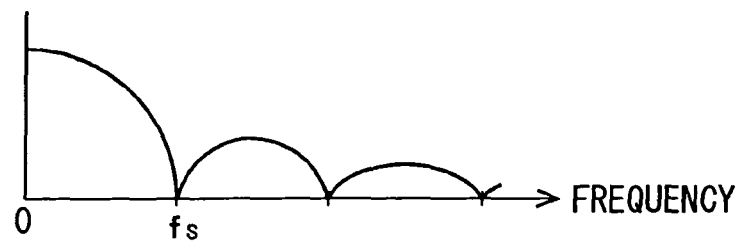
FIGS. 2A-2C are diagrams each showing frequency spectra of various portions of the conventional QPSK modulation circuit.
Figure 2B:
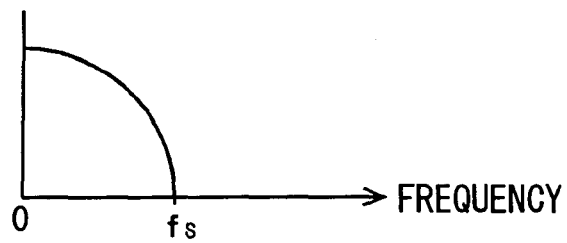
Figure 2C:
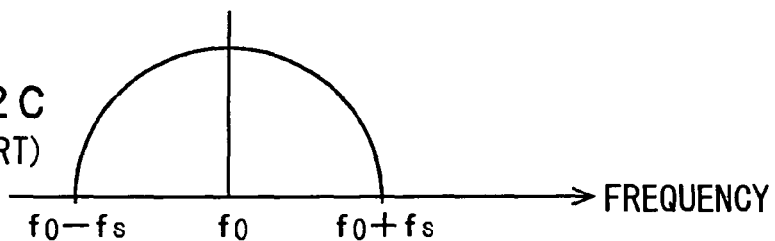
Figure 3:
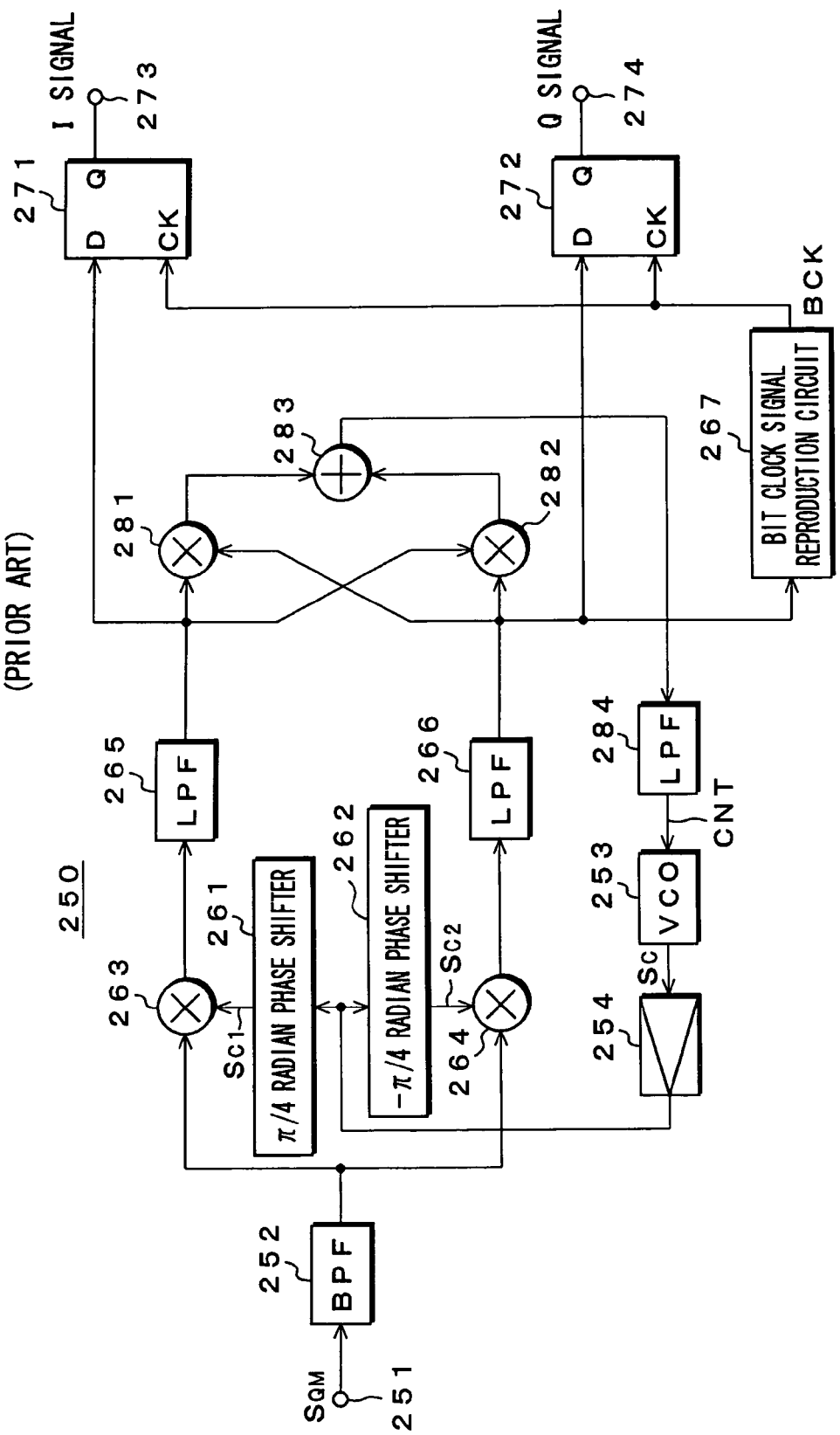
FIG. 3 is a block diagram for showing a configuration example of a conventional QPSK demodulation circuit.

In this case, in contrast to the case of the carrier signal reproduction circuit of the conventional QPSK demodulation circuit 250 (see FIG. 3), no pseudo-demodulation carrier signal which leads to malfunctioning is generated. Further, in this case, to obtain the carrier signal Sc, only one mixer circuit 155 is required to prevent the circuit configuration from becoming complicated due to a large number of mixer circuits in the demodulation circuit, in contrast to the case of the conventional QPSK demodulation circuit 250.

Furthermore, in this case, the carrier signal Sc is obtained using the frequency signals S1 and S2 contained in the modulated QPSK signal $S_{QM}$, so that this carrier signal Sc can be obtained stably even if the frequency $f_0$ of the carrier signal Sc is high, thereby performing demodulation well. Further, in this case, the voltage-controlled oscillator for controlling an oscillation frequency by voltage in order to obtain the carrier signal Sc is rendered unnecessary, thus enabling an inexpensive configuration.

Figure 7:
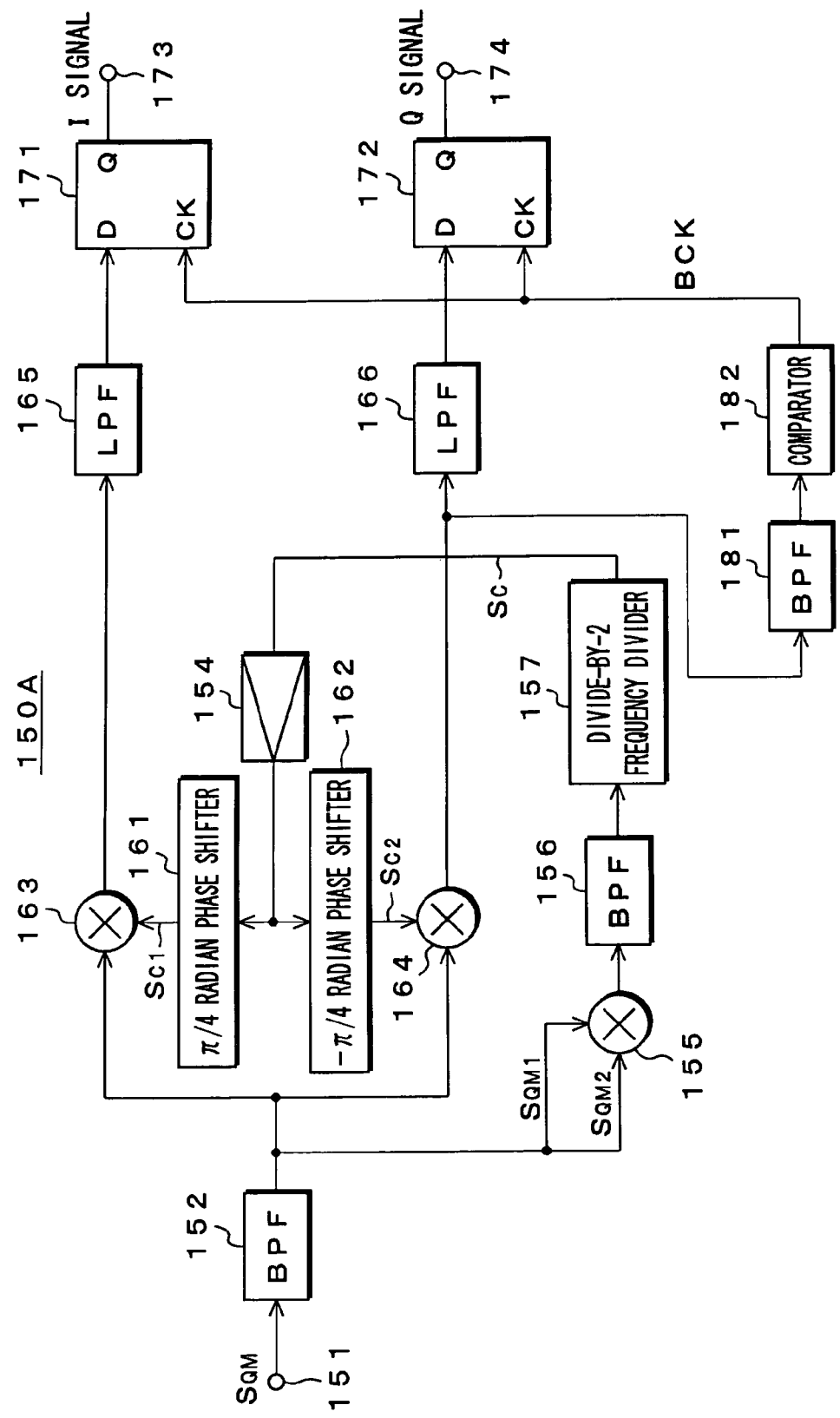
FIG. 7 is a block diagram for showing a configuration of another embodiment of QPSK demodulation circuit according to the invention.

The following will describe a configuration of a QPSK demodulation circuit 150A according to another embodiment of the invention. FIG. 7 shows the QPSK demodulation circuit 150A as another embodiment. This QPSK demodulation circuit 150A is the same as the above-mentioned QPSK demodulation circuit 150 shown in FIG. 6 except only a configuration to obtain a demodulation bit clock signal BCK. In FIG. 7, components corresponding to those of FIG. 6 are indicated by the same reference symbols and their detailed description will be omitted.

This QPSK demodulation circuit 150A comprises a band-pass filter 181 for extracting a frequency $f_S$ ($f_S$ indicates a frequency of the bit clock signal BCK) contained in a detected output obtained by a mixer circuit 164 and a comparator 182 for comparing a frequency signal (sine-wave signal) having the frequency $f_S$ extracted by this band-pass filter 181 to a 0-level threshold value to convert it into a rectangular-wave signal, thereby obtaining a demodulation bit clock signal BCK. The demodulation bit clock signal BCK obtained by this comparator 182 is input to clock signal terminals CK of D flip-flops 171 and 172.

The other components of this QPSK demodulation circuit 150A have the same configurations as those of the QPSK demodulation circuit 150 shown in FIG. 6. This QPSK demodulation circuit 150A operates the same way as the QPSK demodulation circuit 150 shown in FIG. 6 except an operation to obtain the modulating bit clock signal BCK and so can obtain an I signal and a Q signal which are first-channel and second-channel digital signals respectively by demodulating the modulated QPSK signal $S_{QM}$. This QPSK demodulation circuit 150A can obtain the same effects as the QPSK demodulation circuit 150 shown in FIG. 6.

Although in the QPSK demodulation circuit 150A shown in FIG. 7, the frequency signal having the frequency $f_S$ is extracted from a detected output of second channel provided by the mixer circuit 164, the frequency signal having the frequency $f_S$ may be extracted from a detected output of first channel provided by the mixer circuit 163.

The following will describe a configuration of a QPSK demodulation circuit 150B according to further embodiment of the invention. FIG. 8 shows the QPSK demodulation circuit 150B as further embodiment. This QPSK demodulation circuit 150B is the same as the above-mentioned QPSK demodulation circuit 150 shown in FIG. 6 except only a configuration to obtain a demodulation carrier signal Sc. In FIG. 8, components corresponding to those of FIG. 6 are indicated by the same reference symbols and their detailed description will be omitted.

This QPSK demodulation circuit 150B comprises a voltage-controlled oscillator (VCO) 191 for generating a demodulation carrier signal Sc. An amplifier 154 amplifies the carrier signal Sc generated by this oscillator 191. The carrier signal Sc is then input to z phase shifters 161 and 162 to generate first and second carrier signals Sc1 and Sc2.

Further, the QPSK demodulation circuit 150B also comprises band-pass filters 192 and 193. The band-pass filter 192 extracts a frequency signal in a predetermined range having as its center frequency a frequency $f_S$ (which is a frequency of a bit clock signal BCK) contained in a detected output of first channel obtained by a mixer circuit 163. The band-pass filter 193 extracts a frequency signal in a predetermined range having as its center frequency the frequency $f_S$ (which is the frequency of the bit clock signal BCK) contained in a detected output of second channel obtained by a mixer circuit 164.

Further, the QPSK demodulation circuit 150B further comprises a mixer circuit 194 for accumulating an output signal of the band-pass filter 192 and an output signal of the band-pass filter 193 and a low-pass filter 195 for limiting a band of an output signal of this mixer circuit 194 to obtain a control voltage CNT for the above voltage-controlled oscillator 191.

The other components of this QPSK demodulation circuit 150B have the same configurations as those of the QPSK demodulation circuit 150 shown in FIG. 6. This QPSK demodulation circuit 150B operates the same way as the QPSK demodulation circuit 150 shown in FIG. 6 except an operation to obtain the modulating carrier signal Sc and so can obtain an I signal and a Q signal which are first-channel and second-channel digital signals respectively by demodulating the modulated QPSK signal $S_{QM}$.

In this QPSK demodulation circuit 150B, if the frequency of the carrier signal Sc generated by the voltage-controlled oscillator 191 is $(f_0+\Delta')$, a voltage that is proportional to $\Delta'$ can be obtained as the control voltage CNT output from the low-pass filter 195. In this case, $\Delta'$ indicates a fluctuation of the carrier signal Sc from the frequency $f_0$. Therefore, the carrier signal Sc having the frequency $f_0$ can be obtained from this voltage-controlled oscillator 191 by controlling an oscillation frequency of the voltage-controlled oscillator 191 by using the control voltage CNT output from the low-pass filter 195.

The following will describe, with reference to equations, that if the frequency of the carrier signal Sc is $(f_0+\Delta')$, a voltage proportional to $\Delta'$ is output as the control voltage CNT from the low-pass filter 195. It is to be noted that $\Delta'=\Delta/2\pi$.

It is to be noted that the frequency signals S1 and S2 contained in the modulated QPSK signal $S_{QM}$ are expressed as $S1=\sin(\omega_0+\omega_S)\cdot t$ and $S2=(\omega_0-\omega_S)\cdot t$, respectively (see Equation (1)), the first carrier signal Sc1 obtained by the phase shifter 161 is expressed as $Sc1=\cos(\omega_0+\Delta)\cdot t$, and the second carrier signal Sc2 obtained by the phase shifter 162 is expressed as $Sc2=\sin(\omega_0+\Delta)\cdot t$.

In this case, the mixer circuit 163 accumulates the frequency signals S1 and S2 and the carrier signal Sc1 to obtain an accumulated signal Mi given in following Equation (2). Ai and Bi in this Equation (2) are expressed by following Equations (3) and (4), respectively.

$$Mi = \sin(\omega_0+\omega_s)\cdot t \times \cos(\omega_0+\Delta)\cdot t + \sin(\omega_0-\omega_S)\cdot t \times \cos(\omega_0+\Delta)\cdot t \quad (2)$$
$$= Ai + Bi$$

$$Ai = \sin(\omega_0+\omega_S)\cdot t \times \cos(\omega_0+\Delta)\cdot t \quad (3)$$
$$= 0.5\cdot\sin\{(\omega_0+\omega_S)+(\omega_0+\Delta)\}\cdot t + 0.5\cdot\sin\{(\omega_0+\omega_S)-(\omega_0+\Delta)\}\cdot t$$
$$= 0.5\cdot\sin(2\omega_0+\omega_S+\Delta)\cdot t + 0.5\cdot\sin(\omega_S-\Delta)\cdot t$$

$$Bi = \sin(\omega_0-\omega_S)\cdot t \times \cos(\omega_0+\Delta)\cdot t \quad (4)$$
$$= 0.5\cdot\sin\{(\omega_0-\omega_S)+(\omega_0+\Delta)\}\cdot t + 0.5\cdot\sin\{(\omega_0-\omega_S)-(\omega_0+\Delta)\}\cdot t$$
$$= 0.5\cdot\sin(2\omega_0-\omega_S+\Delta)\cdot t + 0.5\cdot\sin(-\omega_S-\Delta)\cdot t$$

Then, the band-pass filter 192 removes a frequency component of a term of $0.5\cdot\sin(2\omega_0+\omega_S+\Delta)\cdot t$ of Equation (3) and a frequency component of a term of $0.5\cdot\sin(2\omega_0-\omega_S+\Delta)\cdot t$ of Equation (4). Therefore, an output signal Mi' of the band-pass filter 192 is expressed by following Equation (5).

$$Mi' = 0.5\cdot\sin(\omega_S-\Delta)\cdot t + 0.5\cdot\sin(-\omega_S-\Delta)\cdot t \quad (5)$$

The mixer circuit 164, on the other hand, accumulates the frequency signals S1 and S2 and the carrier signal Sc2 to obtain an accumulated signal Mq expressed by following Equation (6). Aq and Bq in this Equation (6) are expressed by Equations (7) and (8), respectively.

$$Mq = \sin(\omega_0+\omega_S)\cdot t \times \sin(\omega_0+\Delta)\cdot t + \sin(\omega_0+\omega_S)\cdot t \times \sin(\omega_0+\Delta)\cdot t \quad (6)$$
$$= Aq + Bq$$

$$Aq = \sin(\omega_0+\omega_S)\cdot t \times \sin(\omega_0+\Delta)\cdot t \quad (7)$$
$$= -0.5\cdot\cos\{(\omega_0+\omega_S)+(\omega_0+\Delta)\}\cdot t + 0.5\cdot\cos\{(\omega_0+\omega_S)-(\omega_0+\Delta)\}\cdot t$$
$$= -0.5\cdot\cos(2\omega_0+\omega_S+\Delta)\cdot t + 0.5\cdot\cos(\omega_S-\Delta)\cdot t$$

$$Bq = \sin(\omega_0-\omega_S)\cdot t \times \sin(\omega_0+\Delta)\cdot t \quad (8)$$
$$= -0.5\cdot\cos\{(\omega_0-\omega_S)+(\omega_0+\Delta)\}\cdot t + 0.5\cdot\cos\{(\omega_0-\omega_S)-(\omega_0+\Delta)\}\cdot t$$
$$= -0.5\cdot\cos(2\omega_0-\omega_S+\Delta)\cdot t + 0.5\cdot\cos(-\omega_S-\Delta)\cdot t$$

The band-pass filter 193 removes a frequency component of a term of $-0.5 \cdot \cos(2\omega_0 + \omega\omega_S + \Delta) \cdot t$ of Equation (7) and a frequency component of a term of $-0.5 \cdot \cos(2\omega_0 - \omega_S + \Delta) \cdot t$ of Equation (8). Therefore, an output signal Mq' of the band-pass filter 193 is expressed by following Equation (9).

$$Mq' = 0.5 \cdot \cos(\omega_S - \Delta) \cdot t + 0.5 \cdot \cos(-\omega_S - \Delta) \cdot t \quad (9)$$

The respective output signals Mi' and Mq' of the above-mentioned band-pass filters 192 and 193 are accumulated by the mixer circuit 194 to obtain an accumulated signal Miq expressed by following Equation (10).

$$\begin{aligned}Miq &= \{0.5 \cdot \sin(\omega_S - \Delta) \cdot t + 0.5 \cdot \sin(-\omega_S - \Delta) \cdot t\} \times \{0.5 \cdot \cos\{(\omega_S - \Delta) \cdot t + 0.5 \cdot \cos(-\omega_S - \Delta) \cdot t\} \\ &= 0.25 \times \{\sin(\omega_S - \Delta) \cdot t \times \cos(\omega_S - \Delta) \cdot t + \sin(\omega_S - \Delta) \cdot t \times \cos(-\omega_S - \Delta) \cdot t + \sin(-\omega_S - \Delta) \cdot t \times \cos(\omega_S - \Delta) \cdot t + \sin(-\omega_S - \Delta) \cdot t \times \cos(-\omega_S - \Delta) \cdot t\} \\ &= 0.25 \times (a + b + c + d) \end{aligned} \quad (10)$$

The terms of a, b, c, and d in this Equation (10) are expressed by following Equations (11), (12), (13), and (14) respectively. It is to be noted that since $\Delta$ is very small in value, $\sin \Delta$ is approximated as $\sin \Delta \approx \Delta$ in the terms b and c.

$$\begin{aligned}a &= \sin(\omega_S - \Delta) \cdot t \times \cos(\omega_S - \Delta) \cdot t \\ &= 0.5 \cdot \sin 2(\omega_S - \Delta) \cdot t\end{aligned} \quad (11)$$

$$\begin{aligned}b &= \sin(\omega_S - \Delta) \cdot t \times \cos(-\omega_S - \Delta) \cdot t \\ &= 0.5 \cdot \sin\{(\omega_S - \Delta) + (-\omega_S - \Delta)\} \cdot t + 0.5 \cdot \sin\{(\omega_S - \Delta) - (-\omega_S - \Delta)\} \cdot t \\ &= 0.5 \cdot \sin(-2\Delta) \cdot t \approx 0.5 \cdot (-2\Delta)(\cdot t = -\Delta \cdot t\end{aligned} \quad (12)$$

$$\begin{aligned}c &= \sin(-\omega_S - \Delta) \cdot t \times \cos(\omega_S - \Delta) \cdot t \\ &= 0.5 \cdot \sin\{(-\omega_S - \Delta) + (\omega_S - \Delta)\} \cdot t + 0.5 \cdot \sin\{(-\omega_S - \Delta) - (\omega_S - \Delta)\} \cdot t \\ &= 0.5 \cdot \sin(-2\Delta) \cdot t \approx 0.5 \cdot (-2\Delta) \cdot t = -\Delta \cdot t\end{aligned} \quad (13)$$

$$\begin{aligned}d &= \sin(-\omega_S - \Delta) \cdot t \times \cos(-\omega_S - \Delta) \cdot t \\ &= 0.5 \cdot \sin 2(-\omega_S - \Delta) \cdot t\end{aligned} \quad (14)$$

From the above-mentioned accumulated signal Miq output from the mixer circuit 194, frequency components of terms a and b are removed by the low-pass filter 195. Therefore, the control voltage CNT output from the low-pass filter 195 is expressed by following Equation (15), being equal to a voltage proportional to $\Delta' = \Delta/2\pi$.

$$CNT = 0.25 \times (0 - \Delta \cdot t - \Delta \cdot t + 0) = -0.5\Delta \cdot t \quad (15)$$

In such a manner, the QPSK demodulation circuit 150B shown in FIG. 8 handles the modulated QPSK signal $S_{QM}$ containing the frequency signals S1 and S2 that have the sum of the frequency $f_S$ of the bit clock signal BCK and the frequency $f_0$ of the carrier signal Sc and the difference between them respectively. The QPSK demodulation circuit 150B can use these frequency signals S1 and S2 to obtain a demodulation carrier signal Sc and a demodulation bit clock signal BCK. This allows the demodulation carrier signal Sc and the demodulation bit clock signal BCK to be stably obtained with a simple configuration and without difficulty.

In this case, in contrast to the case of the carrier signal reproduction circuit of the conventional QPSK demodulation circuit 250 (see FIG. 3), no pseudo-demodulation carrier signal which leads to malfunctioning is generated. Further, in this case, the frequency signals S1 and S2 contained in the modulated QPSK signal $S_{QM}$ are used to obtain the demodulation carrier signal Sc, so that this carrier signal Sc can be obtained stably even if the frequency $f_0$ of the carrier signal Sc is high, thereby performing demodulation well.

The following will describe a configuration of a QPSK demodulation circuit 150C according to a still further embodiment of the invention. FIG. 9 shows the QPSK demodulation circuit 150C as the still further embodiment. This QPSK demodulation circuit 150C is the same as the above-mentioned QPSK demodulation circuit 150B shown in FIG. 8 except only a configuration to obtain a demodulation bit clock signal BCK. In FIG. 9, components corresponding to those of FIG. 8 are indicated by the same reference symbols and their detailed description is omitted.

This QPSK demodulation circuit 150C obtains the bit clock signal BCK similar to the above-mentioned QPSK demodulation circuit 150A shown in FIG. 7. That is, it comprises a band-pass filter 181 for extracting a frequency $f_S$ ($f_S$ indicates a frequency of the bit clock signal BCK) contained in a detected output obtained by a mixer circuit 164 and a comparator 182 for comparing a frequency signal (sine-wave signal) having the frequency $f_S$ extracted by this band-pass filter 181 to a 0-level threshold value to convert it into a rectangular-wave signal, thereby obtaining the demodulation bit clock signal BCK. The demodulation bit clock signal BCK obtained by this comparator 182 is input to clock signal terminals CK of D flip-flops 171 and 172.

The other components of this QPSK demodulation circuit 150C have the same configurations as those of the QPSK demodulation circuit 150B shown in FIG. 8. This QPSK demodulation circuit 150C operates the same way as the QPSK demodulation circuit 150B shown in FIG. 8 except an operation to obtain the demodulation bit clock signal BCK and so can obtain an I signal and a Q signal which are first-channel and second-channel digital signals, respectively, by demodulating the modulated QPSK signal $S_{QM}$. This QPSK demodulation circuit 150C can obtain the same useful effects as that obtained by the QPSK demodulation circuit 150B shown in FIG. 8.

Although in the QPSK demodulation circuit 150C shown in FIG. 9, the frequency signal having the frequency $f_S$ is extracted from a detected output of second channel provided by the mixer circuit 164, the frequency signal having the frequency $f_S$ may be extracted from a detected output of first channel provided by the mixer circuit 163.

Although in the above embodiment, the present invention has been applied to a QPSK modulation/demodulation circuit, the present invention can be similarly applied to any other digital modulation/demodulation circuit for accumulating a digital signal and a carrier signal to obtain a modulated digital signal, for example, a BPSK modulation/demodulation circuit etc.

Thus has been described a digital modulation circuit, a digital modulation method and the like according to the present invention wherein a modulated digital signal is generated which contains frequency signals whose frequencies are a sum of a frequency of a bit clock signal and a frequency of a carrier signal and a difference between the two respectively, so that when demodulating this modulated digital signal, a demodulation carrier signal and a demodulation bit clock signal can be stably obtained with a simple configuration and without difficulty. While the foregoing specification has described preferred embodiment (s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. A circuit for generating a demodulation carrier signal used to demodulate a modulated digital signal, the circuit comprising:
    an accumulator configured to generate an output by accumulating modulated first and second signals branched from the modulated digital signal, each of the modulated first and second signals containing a first signal having a frequency corresponding to a sum of first and second frequencies and a second signal having a frequency corresponding to a difference between the first and second frequencies, the first frequency being a frequency of a bit clock signal and the second frequency being a frequency of a carrier signal;
    a band-pass filter directly connected to the accumulator and configured to extract a frequency signal having twice the frequency of the carrier signal from the output of the accumulator; and
    a carrier signal generator connected to the band-pass filter and configured to divide the frequency signal output from the band-pass filter to obtain the demodulation carrier signal having the same frequency as the carrier signal.

2. A method of generating a demodulation carrier signal that is used when demodulating a modulated digital signal, the method comprising:
    generating, at an accumulator, an accumulated signal by accumulating modulated first and second signals, obtained by branching the modulated digital signals, each of the modulated first and second signals containing a first signal having a frequency corresponding to a sum of first and second frequencies and a second signal having a frequency corresponding to a difference between the first and second frequencies, the first frequency being a frequency of a bit clock signal and the second frequency being a frequency of a carrier signal;
    extracting, at a band-pass filter directly connected to the accumulator, a frequency signal having twice the frequency of the carrier signal from the accumulated signal; and
    dividing, at a carrier signal generator, the frequency signal output from the band-pass filter to obtain the demodulation carrier signal having the same frequency as the carrier signal.

3. A circuit for generating a demodulation bit clock signal that is used when demodulating a modulated digital signal, the circuit comprising:
    an accumulator configured to generate an output by accumulating modulated first and second signals, obtained by branching the modulated digital signal, each of the modulated first and second signals containing a first signal having a frequency corresponding to a sum of first and second frequencies and a second signal having a frequency corresponding to a difference between the first and second frequencies, the first frequency being a frequency of a bit clock signal and the second frequency being a frequency of a carrier signal;
    a band-pass filter directly connected to the accumulator and configured to extract a frequency signal having twice the frequency of the bit clock signal from the output of the accumulator; and
    a bit clock signal generator connected to the band-pass filter and configured to divide the frequency signal output from the band-pass filter to obtain the demodulation bit clock signal having the same frequency as the bit clock signal.

4. A method of generating a demodulation bit clock signal that is used when demodulating a modulated digital signal, the method comprising:
    generating, at an accumulator, an accumulated signal by accumulating modulated first and second signals, obtained by branching the modulated digital signal, each of the modulated first and second signals containing a first signal having a frequency corresponding to a sum of first and second frequencies and a second signal having a frequency corresponding to a difference between the first and second frequencies, the first frequency being a frequency of a bit clock signal and the second frequency being a frequency of a carrier signal;
    extracting, at a band-pass filter directly connected to the accumulator, a frequency signal having twice the frequency of the bit clock signal from the accumulated signal; and
    dividing, at a bit clock signal generator, the frequency signal output from the band-pass filter to obtain the demodulation bit clock signal having the same frequency as the bit clock signal.

5. A digital demodulation circuit for demodulating a modulated quadrature signal, the circuit comprising:
    a first accumulator configured to generate an output by accumulating modulated first and second signals, obtained by branching the modulated quadrature signal, each of the modulated first and second signals containing a first signal having a frequency corresponding to a sum of first and second frequencies and a second signal having a frequency corresponding to a difference between the first and second frequencies, the first frequency being a frequency of a bit clock signal and the second frequency being a frequency of a carrier signal;
    a band-pass filter directly connected to the first accumulator and configured to extract a frequency signal having twice the frequency of the carrier signal from the output of the accumulator;
    a first frequency divider connected to the band-pass filter and configured to divide the frequency signal output from the band-pass filter to obtain a frequency signal having the same frequency as the carrier signal;

a carrier signal generator, connected to the first frequency divider and configured to generate a first carrier signal and a second carrier signal, said first and second carrier signals having a phase difference of 90 degrees with respect to each other based on the frequency signal obtained by the first frequency divider;

a second accumulator connected to the carrier signal generator and configured to accumulate the modulated quadrature signal and the first carrier signal generated by the carrier signal generator, to obtain a detected output of first-channel; and a third accumulator connected to the carrier signal generator and configured to accumulate the modulated quadrature signal and the second carrier signal generated by the carrier signal generator, to obtain a detected output of second-channel.

6. The digital demodulation circuit according to claim 5, further comprising:

second frequency divider configured to divide a frequency signal having twice the frequency of the bit clock signal contained in the output signal of the first accumulator, to obtain a frequency signal having the same frequency as that of the bit clock signal;

first bit data extractor configured to sequentially extract each bit data from the detected output of the first channel obtained by the second accumulator based on the frequency signal obtained by the second frequency divider, said bit data constituting a digital signal of the first channel; and second bit data extractor configured to sequentially extract each bit data from the detected output of the second channel obtained by the third accumulator based on the frequency signal obtained by the second frequency divider, said bit data constituting a digital signal of the second channel.

7. The digital demodulation circuit according to claim 5, further comprising:

a filter configured to extract a frequency signal having the same frequency as that of the bit clock signal from any one of the detected output of the first channel obtained by the second accumulator and the detected output of the second channel obtained by the third accumulator;

a first bit data extractor configured to sequentially extract each bit data from the detected output of the first channel obtained by the second accumulator based on the frequency signal extracted by the filter, said bit data constituting a digital signal of the first channel; and second bit data extractor configured to for sequentially extract each bit data from the detected output of the second channel obtained by the third accumulator ion based on the frequency signal extracted by the filter, said bit data constituting a digital signal of the second channel.

8. A digital demodulation method of demodulating a modulated quadrature signal, the method comprising:

generating, at a first accumulator, an accumulated signal by accumulating modulated first and second signals, obtained by branching the modulated quadrature signal, each of the modulated first and second signals containing a first signal having a frequency corresponding to a sum of first and second frequencies and a second signal having a frequency corresponding to a difference between the first and second frequencies, the first frequency being a frequency of a bit clock signal and the second frequency being a frequency of a carrier signal;

extracting, at a band-pass filter directly connected to the first accumulator, a frequency signal having twice the frequency of the carrier signal from the accumulated signal;

dividing, at a frequency divider, the frequency signal output from the band-pass filter to obtain a frequency signal having the same frequency as the carrier signal;

generating, at a carrier signal generator, a first carrier signal and a second carrier signal, said first and second carrier signals having a phase difference of 90 degrees with respect to each other based on the frequency signal output by the frequency divider;

accumulating, at a second accumulator, the modulated quadrature signal and the first carrier signal generated by the carrier signal generator, to obtain a detected output of the first channel; and accumulating, at a third accumulator, the modulated quadrature signal and the second carrier signal generated by the carrier signal generator, to obtain a detected output of the second channel.

9. A circuit for generating a demodulation carrier signal that is used when demodulating a modulated quadrature signal, the circuit comprising:

a voltage-controlled oscillator configured to generate said demodulation carrier signal having the same frequency as that of the carrier signal;

an amplifier connected to the voltage-controlled oscillator and configured to amplify the demodulation carrier signal output from the voltage-controlled oscillator;

a frequency generator configured to generate third and fourth frequency signals having a phase difference of 90 degrees with respect to each other based on an output signal of the amplifier;

a first accumulator configured to accumulate the modulated quadrature signal the modulated quadrature signal including a first frequency signal having the frequency corresponding to a sum of first and second frequencies and a second frequency signal having a frequency corresponding to a difference between first and second frequencies, the first frequency being a frequency of a bit clock signal and the second frequency being a frequency of a carrier signal, and the third frequency signal generated by the frequency generator;

a second accumulator configured to accumulate the modulated quadrature signal and the fourth frequency signal generated by the frequency generator;

a first filter configured to extract from an output signal of the first accumulator a frequency signal in a predetermined range having the frequency of the bit clock signal as its center frequency;

a second filter configured to extract from an output signal of the second accumulator a frequency signal in a predetermined range having the frequency of the bit clock signal as its center frequency;

third accumulator configured to accumulate an output signal of the first filter and an output signal of the second filter;

a third filter configured to limit a band of an output signal of the third accumulator, to obtain a control voltage for the voltage-controlled oscillator;

a frequency divider configured to divide the modulated quadrature signal to obtain a frequency signal having the same frequency as that of the bit clock signal; and a comparator directly connected to the frequency divider and configured to obtain the bit clock signal by comparing the frequency signal output from the frequency divider to a predetermined threshold.

10. A method of generating a demodulation carrier signal that is used when demodulating a modulated quadrature signal, the method comprising:
generating, at a frequency generator, a third and a fourth frequency signal having a phase difference of 90 degrees with respect to each other based on an amplified output signal of a voltage-controlled oscillator via a connected amplifier to generate the demodulation carrier signal having the same frequency as that of the carrier signal;
accumulating, at a first accumulator, the modulated quadrature signal and the third frequency signal, the modulated quadrature signal including a first frequency signal having the frequency corresponding to a sum of a first and a second frequency and a second frequency signal having a frequency corresponding to a difference between the first and second frequencies, the first frequency being a frequency of a bit clock signal and the second frequency being a frequency of a carrier signal, generated by the frequency generator;
accumulating, at a second accumulator, the modulated quadrature signal and the fourth frequency signal generated by the frequency generator;
extracting, at a first filter, a frequency signal in a predetermined range having the frequency of the bit clock signal as a center frequency from a signal output by the first accumulator;
extracting, at a second filter, a frequency signal in a predetermined range having the frequency of the bit clock signal as its center frequency from a signal output by the second accumulator;
accumulating, at a third accumulation accumulator, the frequency signal extracted by the first filter and the frequency signal extracted by the second filter;
extracting, at a third filter, a control voltage for the voltage-controlled oscillator by limiting a band of a signal output by the third accumulator;
dividing, at a frequency divider, the modulated quadrature signal to obtain a frequency signal having the same frequency as that of the bit clock signal; and
comparing, at a comparator directly connected to the frequency divider, the frequency signal output from the frequency divider to a predetermined threshold to obtain the bit clock signal.

11. A digital demodulation circuit for demodulating a modulated quadrature signal, the circuit comprising:
a voltage-controlled oscillator configured to generate a frequency signal having the same frequency as that of the carrier signal;
an amplifier connected to the voltage-controlled oscillator and configured to amplify the frequency signal output from the voltage-controlled oscillator;
a carrier signal generator configured to generate first and second carrier signals having a phase difference of 90 degrees with respect to each other based on an output signal of the amplifier;
a first accumulator configured to accumulate the modulated quadrature signal, the modulated quadrature signal including a first frequency signal having the frequency corresponding to a sum of first and second frequencies and a second frequency signal having a frequency corresponding to a difference between first and second frequencies, the first frequency being a frequency of a bit clock signal and the second frequency being a frequency of a carrier signal, and the first carrier signal generated by the carrier signal generator, to obtain a detected output of first channel;
a second accumulator configured to accumulate the modulated quadrature signal and the second carrier signal generated by the carrier signal generator, to obtain a detected output of second channel;
a first filter for extracting a frequency signal in a predetermined range having as its center frequency the frequency of the bit clock signal from the detected output of the first channel obtained by the first accumulator;
a second filter configured to extract a frequency signal in a predetermined range having as its center frequency the frequency of the bit clock signal from the detected output of the second channel obtained by the second accumulator;
a third accumulator configured to accumulate an output signal of the first filter and an output signal of the second filter;
a third filter configured to limit a band of an output signal of the third accumulator, to extract a control voltage for the voltage-controlled oscillator;
a frequency divider configured to divide the modulated quadrature signal to obtain a frequency signal having the same frequency as that of the bit clock signal; and
a comparator directly connected to the frequency divider and configured to obtain the bit clock signal by comparing the frequency signal output from the frequency divider to a predetermined threshold.

12. The digital demodulation circuit according to claim 11, further comprising:
a fourth accumulator for accumulating modulated first and second signals obtained by branching the modulated quadrature signal;
a first bit data extractor configured to sequentially extract each bit data from the detected output of the first channel obtained by the first accumulator based on the bit clock signal obtained by the comparator, said bit data constituting a digital signal of the first channel; and
a second bit data extractor configured to sequentially extract each bit data from the detected output of the second channel obtained by the second accumulator based on the bit clock signal obtained by the comparator, said bit data constituting a digital signal of the second channel.

13. A digital demodulation circuit for demodulating a modulated quadrature signal, the circuit comprising:
a voltage-controlled oscillator configured to generate a frequency signal having the same frequency as that of the carrier signal;
an amplifier connected to the voltage-controlled oscillator and configured to amplify the frequency signal output from the voltage-controlled oscillator;
a carrier signal generator configured to generate first and second carrier signals having a phase difference of 90 degrees with respect to each other based on an output signal of the amplifier;
a first accumulator configured to accumulate the modulated quadrature signal, the modulated quadrature signal including a first frequency signal having the frequency corresponding to a sum of first and second frequencies and a second frequency signal having a frequency corresponding to a difference between first and second frequencies, the first frequency being a frequency of a bit clock signal and the second frequency being a frequency of a carrier signal, and the first carrier signal generated by the carrier signal generator, to obtain a detected output of first channel;
a second accumulator configured to accumulate the modulated quadrature signal and the second carrier signal generated by the carrier signal generator, to obtain a detected output of second channel;

a first filter for extracting a frequency signal in a predetermined range having as its center frequency the frequency of the bit clock signal from the detected output of the first channel obtained by the first accumulator;

a second filter configured to extract a frequency signal in a predetermined range having as its center frequency the frequency of the bit clock signal from the detected output of the second channel obtained by the second accumulator;

a third accumulator configured to accumulate an output signal of the first filter and an output signal of the second filter;

a third filter configured to limit a band of an output signal of the third accumulator, to extract a control voltage for the voltage-controlled oscillator;

a fourth filter configured to extract a frequency signal having the same frequency as that of the bit clock signal from any one of the output signal of the first accumulator and the output signal of the second accumulator;

a first bit data extractor configured to sequentially extract each bit data from the detected output of the first channel obtained by the first accumulator based on the frequency signal extracted by the fourth filter, said bit data constituting a digital signal of the first channel; and a second bit data extractor sequentially extract each bit data from the detected output of the second channel obtained by the second accumulator based on the frequency signal extracted by the fourth filter, said bit data constituting a digital signal of the second channel.

14. A digital demodulation method of demodulating a modulated quadrature signal, the method comprising:

generating, at a carrier signal generator, a first and a second carrier signal having a phase difference of 90 degrees with respect to each other based on an amplified output signal of a voltage-controlled oscillator via a connected amplifier to generate a frequency signal having the same frequency as that of the carrier signal;

accumulating, at a first accumulator, the modulated quadrature signal, the modulated quadrature signal including a first frequency signal having the frequency corresponding to a sum of first and second frequencies and a second frequency signal having a frequency corresponding to a difference between first and second frequencies, the first frequency being a frequency of a bit clock signal and the second frequency being a frequency of a carrier signal, and the first carrier signal generated by the carrier signal generator, to obtain a detected output of first channel;

accumulating, at a second accumulator, the modulated quadrature signal and the second carrier signal generated by the carrier signal generator, to obtain a detected output of second channel;

extracting, at a first filter, a frequency signal in a predetermined range having the frequency of the bit clock signal as its center frequency from the detected output of the first channel;

extracting, at a second filter, a frequency signal in a predetermined range having the frequency of the bit clock signal as its center frequency from the detected output of the second channel;

accumulating, at a third accumulator, the frequency signal extracted by the first filter and the frequency signal extracted by the second filter;

extracting, at a third filter, a control voltage for the voltage-controlled oscillator by limiting a band of a signal output by the third accumulator;

dividing, at a frequency divider, the modulated quadrature signal to obtain a divided frequency signal having the same frequency as that of the bit clock signal; and comparing, at a comparator directly connected to the frequency divider, the divided frequency signal to a predetermined threshold to obtain the bit clock signal.

* * * * *